United States Patent [19]

Shukunami et al.

[11] Patent Number: 5,778,129
[45] Date of Patent: Jul. 7, 1998

[54] DOPED OPTICAL FIBER HAVING CORE AND CLAD STRUCTURE FOR INCREASING THE AMPLIFICATION BAND OF AN OPTICAL AMPLIFIER USING THE OPTICAL FIBER

[75] Inventors: Norifumi Shukunami, Sapporo; Shinya Inagaki, Kawasaki, both of Japan

[73] Assignee: Fujitsu Limited, Kawasaki, Japan

[21] Appl. No.: 727,776

[22] Filed: Oct. 8, 1996

[30] Foreign Application Priority Data

Jan. 12, 1996 [JP] Japan ................................. 8-004287

[51] Int. Cl.$^6$ ................................. G02B 6/22
[52] U.S. Cl. ................................. 385/127; 359/341
[58] Field of Search ................................. 385/126, 127; 359/341

[56] References Cited

U.S. PATENT DOCUMENTS

| | | | |
|---|---|---|---|
| 4,953,947 | 9/1990 | Bhagavatula | 385/126 |
| 5,058,976 | 10/1991 | DiGiovanni et al. | 385/27 |
| 5,278,850 | 1/1994 | Ainslie et al. | 385/142 |
| 5,284,500 | 2/1994 | Okamura et al. | 65/378 |
| 5,483,612 | 1/1996 | Gallagher et al. | 385/127 |
| 5,570,448 | 10/1996 | Imoto et al. | 385/141 |

FOREIGN PATENT DOCUMENTS 5-119222  5/1993  Japan.

*Primary Examiner*—John D. Lee
*Assistant Examiner*—Ellen Eunjoo Kang
*Attorney, Agent, or Firm*—Staas & Halsey

[57] ABSTRACT

An optical fiber having a core for propagating light, where the core includes first, second and third regions. The first, second and third regions are concentrically arranged with the second region around the first region and the third region around the second region. The third region includes a dopant for increasing the refractive index of the third region. The first region includes a first dopant for providing an amplification band and a second dopant for expanding the amplification band. The second region has an impurity concentration which is lower than the concentration of the dopant in the third region and is lower than the concentrations of the first and second dopants in the first region. Upon production of the fiber, the second region acts as a barrier to prevent diffusion of dopants. As a result, the amplification band can be effectively expanded. Various other arrangements of core and clad regions and dopants are provided. An optical amplifier using the various types of fibers is disclosed, as is a fiber having a structure which reduces loss when spliced to another fiber, and a method for splicing the fibers together.

58 Claims, 17 Drawing Sheets

POSITION ALONG FIBER CROSS-SECTION

POSITION ALONG FIBER
CROSS-SECTION

DOPED OPTICAL FIBER HAVING CORE AND CLAD STRUCTURE FOR INCREASING THE AMPLIFICATION BAND OF AN OPTICAL AMPLIFIER USING THE OPTICAL FIBER

CROSS-REFERENCE TO RELATED APPLICATIONS

This application claims priority to, and is based on, Japanese patent application number 08-4287, filed on Jan. 12, 1996, in Japan, and which is incorporated herein by reference.

BACKGROUND OF THE INVENTION

1. Field of the Invention

The present invention relates to a doped optical fiber having a core and clad structure which increases the amplification band of an optical amplifier using the optical fiber as an optical amplifying medium.

2. Description of the Related Art

Optical communication systems typically use wavelength division multiplexing (WDM) to increase the transmission capacity of the system. With WDM, a plurality of individual signals, each having a different wavelength, are multiplexed together into a WDM signal. Generally, the WDM signal is transmitted through a transmission line to a demultiplexer, where the WDM signal is demultiplexed back into the plurality of individual signals. The transmission line is often a single optical fiber.

An optical amplifier, such as an erbium-doped fiber amplifier (EDFA), is typically used to amplify the WDM signal as the WDM signal propagates through the transmission line. Generally, an EDFA uses an erbium-doped fiber (EDF) as an amplifying medium. As the WDM signal travels through the EDF, pump light is provided to the EDF so that the pump light interacts with, and thereby amplifies, the WDM signal. The amplification band of the optical amplifier is determined by the selection of dopants in various regions of the EDF, and by the wavelength of the pump light. For example, erbium (ER) is a suitable dopant in a fiber to amplify a WDM signal having a wavelength in the 1.55 μm band. In this case, the pump light preferably has a wavelength in the 0.98 μm band or in the 1.48 μm band.

It preferable for an optical amplifier to have an amplification band which is large enough to appropriately amplify the various signals multiplexed together into the WDM signal. Unfortunately, in many circumstances, a conventional EDF will not allow the optical amplifier to have a large enough amplification band.

SUMMARY OF THE INVENTION

Accordingly, it is an object of the present invention to provide a doped fiber which will provide an optical amplifier with an expanded amplification band. Here, the "expansion of an amplification band" includes expansion of the full width at half maximum (FWHM) of the amplification band.

It is also an object of the present invention to provide an optical amplifier which has an expanded amplification band.

It is a further object of the present invention to provide a first optical fiber which can easily be spliced to a second optical fiber, wherein the structure of the first optical fiber minimizes optIcal loss of a signal travelling through the spliced first and second optical fibers.

It is an additional object of the present invention to provide a method of splicing a first optical fiber to a second optical fiber, wherein the resulting, spliced first and second optical fibers have a structure which minimizes optical loss of a signal travelling through the spliced first and second fibers.

Additional objects and advantages of the invention will be set forth in part in the description which follows, and, in part, will be obvious from the description, or may be learned by practice of the invention.

The foregoing objects of the present invention are achieved by providing an optical device (such as an optical fiber) which has a core for propagating light. The core include first, second and third regions each having a corresponding refractive index. The first, second and third regions are concentrically arranged with the second region around the first region and the third region around the second region. The refractive index of the third region is higher than the refractive index of the first region, and the refractive index of the first region is higher than the refractive index of the second region. A clad can be provided around the core, where the clad has a refractive index distribution which causes the core and clad to function together as a waveguide.

Objects of the present invention are also achieved by doping the third region with a dopant for providing the refractive index of the third region, and doping the first region with a first dopant for providing an amplification band and a second dopant for expanding the amplification band. The second region preferably includes an impurity concentration which is lower than the concentration of the dopant in the third region and is lower than the concentrations of the first and second dopants in the first region.

Objects of the present invention are also achieved by providing an optical device (such as an optical fiber) having a core for propagating light, where the core includes first, second and third regions. The first, second and third regions are concentrically arranged with the second region around the first region and the third region around the second region. The third region includes a dopant for increasing the refractive index of the third region. The first region includes a first dopant for providing an amplification band and a second dopant for expanding the amplification band. The second region includes an impurity concentration which is lower than the concentration of the dopant in the third region and is lower than the concentrations of the first and second dopants in the first region.

Moreover, objects of the present invention are achieved by providing an optical device (such as an optical fiber) which includes a core and a clad. The clad is concentrically arranged around the core, and the core and clad functioning together as a waveguide. The core includes a dopant to provide the core with a refractive index which is higher than the refractive index of the clad. The clad includes first and second regions concentrically arranged around the core with the first region being between the core and the second region. The second region of the clad includes a first dopant for providing an amplification band and a second dopant or expanding the amplification band. The first region of the clad has an impurity concentration which is lower than the concentration of the dopant in the core, and is lower than the concentrations of the first and second dopants in the first region.

In addition, objects of the present invention are achieved by providing an optical device (such as an optical fiber) which includes a core and a clad, with the clad concentrically arranged around the core. Further, the core includes a first dopant for providing the core with a refractive index which is higher than the refractive index of the clad so that the core and clad operate together as a waveguide, a second dopant for providing an amplification band and a third dopant for expanding the amplification band. The clad includes a diffusion region concentrically arranged around the core. The diffusion region includes a dopant with a concentration substantially equal to the concentration of the third dopant in the core.

In each of the above-described optical devices, the core and clad can be an optical fiber which propagates light therethrough, and the optical device can further include a light source providing amplifying light to the optical fiber so that the amplifying light interacts with, and thereby amplifies, the light propagating through the optical fiber. In this manner, the optical device is an optical amplifier.

Objects of the present invention are also achieved by providing a method for splicing a first optical fiber to a second optical fiber. The first critical fiber includes a core, and a clad concentrically arranged around the core. The core includes a first dopant for providing the core with a refractive index which is higher than the refractive index of the clad so that the core and clad operate together as a waveguide, a second dopant for providing an amplification band and a third dopant for expanding the amplification band. The clad includes a diffusion region concentrically arranged around the core. The diffusion region includes a dopant with a concentration substantially equal to the concentration of the third dopant in the core. The second optical fiber includes a core. The core of the first optical fiber has a smaller diameter than the core of the second optical fiber. The method includes the steps of (a) contacting an end face of the first optical fiber to an end face of the second optical fiber; and (2) heating the contacted end faces to connect the first optical fiber to the second optical fiber.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1A:
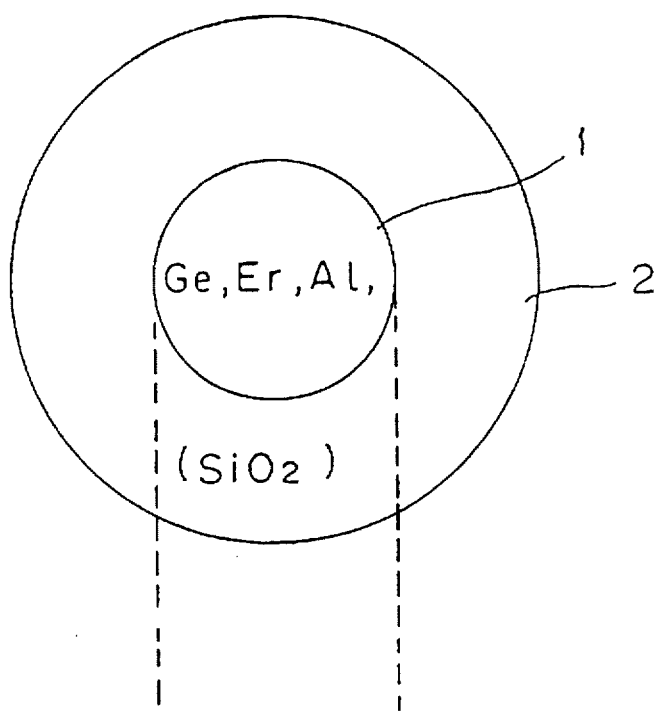
FIG. 1A (prior art) is a diagram illustrating a cross-section of a conventional doped fiber.

Reference will now be made in detail to the present preferred embodiments of the present invention, examples of which are illustrated in the accompanying drawings, wherein like reference numerals refer to like elements throughout.

Moreover, various optical fibers will be discussed below, these optical fibers having a core and a clad. It is known that different types of dopants in the core and clad provide an optical fiber having different characteristics. To facilitate understanding of the present invention, it is assumed that the principal components of the core and the clad are silica ($SiO_2$), a dopant for raising the refractive index is principally germanium (Ge), a dopant for providing an amplification band by optical pumping is erbium (Er), and a dopant for expanding the amplification band is aluminum (Al) However, various embodiments of the present invention are not intended to be limited to these specific dopants, and other dopants can be used to provide the required effect. For example, the principal component of the core and/or the clad may be a halide, such as fluoride. Also, for example, a dopant for providing an amplification band by optical pumping may be some other rare earth element, such as neodymium (Nd).

A "preform" is an intermediate medium in the production process for producing an optical fiber. In addition, a preform used to make a fiber has a similar cross-sectional structure as the fiber. Therefore, the terminology "fiber" or "doped fiber", as used herein, includes a "preform".

Figure 1B:
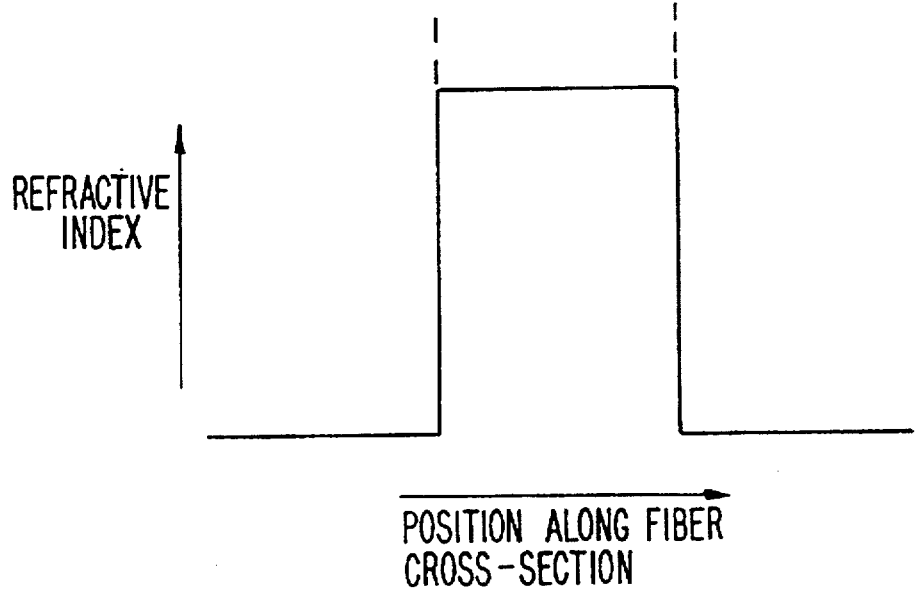
FIG. 1B (prior art) is a diagram illustrating a refractive index distribution of the fiber illustrated in FIG. 1A.

FIG. 1A is a diagram illustrating a cross-section of a conventional doped fiber, and FIG. 1D is a diagram illustrating a refractive index distribution of the fiber illustrated in FIG. 1A. Referring now to FIGS. 1A and 1B, the doped fiber includes a core 1 and a clad 2. Core 1 is doped with Ge, Er and Al. As described above, the dopant Ge is for raising the refractive index of core 1, the dopant erbium (Er) is for providing an amplification band by optical pumping, and The dopant aluminum (Al) is for expanding the amplification band. In the fiber illustrated in FIG. 1A, aluminum Al is doped uniformly in the core 1.

Owing to Ge doped in core 1, the refractive index of core 1 is higher than the refractive index of clad 2, thereby providing a waveguide structure to propagate light through the fiber. The diameters of core 1 and clad 2 are, for example, 2.7 µm and 125 µm, respectively.

It is preferable to have an expanded amplification band to effectively amplify a WDM light with the fiber. Therefore, it is preferable to have a high concentration of aluminum Al in the core, to thereby expand the amplification band. However, aluminum cannot be effectively doped in a high concentration. More specifically, if Al is doped uniformly in a high concentration, then crystallization of an aluminum oxide makes the fiber white opaque and the structure loss of the fiber is increased to such a level that the fiber cannot be used in actual practice. Consequently, aluminum Al cannot be effectively doped in a high concentration, and the amplification band cannot be effectively expanded.

Figure 2A:
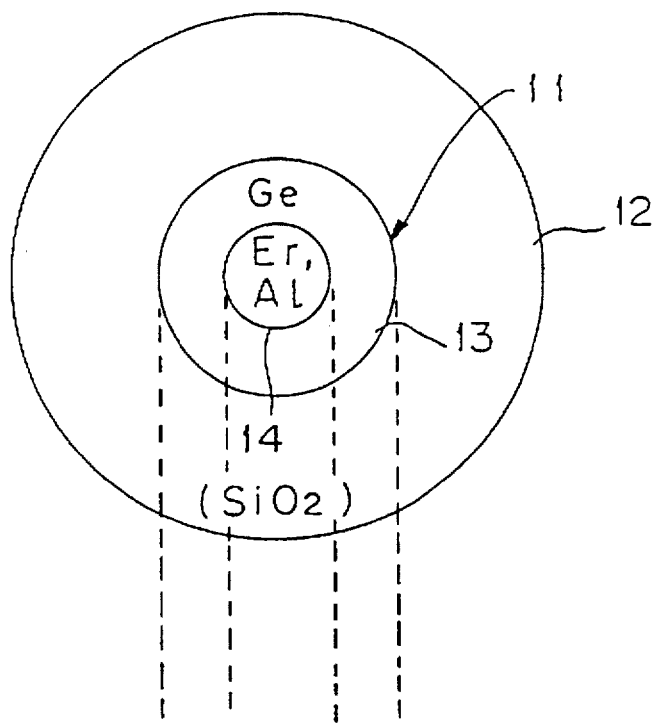
FIG. 2A (prior art) is a diagram illustrating a cross-section of a different, conventional doped fiber.
Figure 2B:
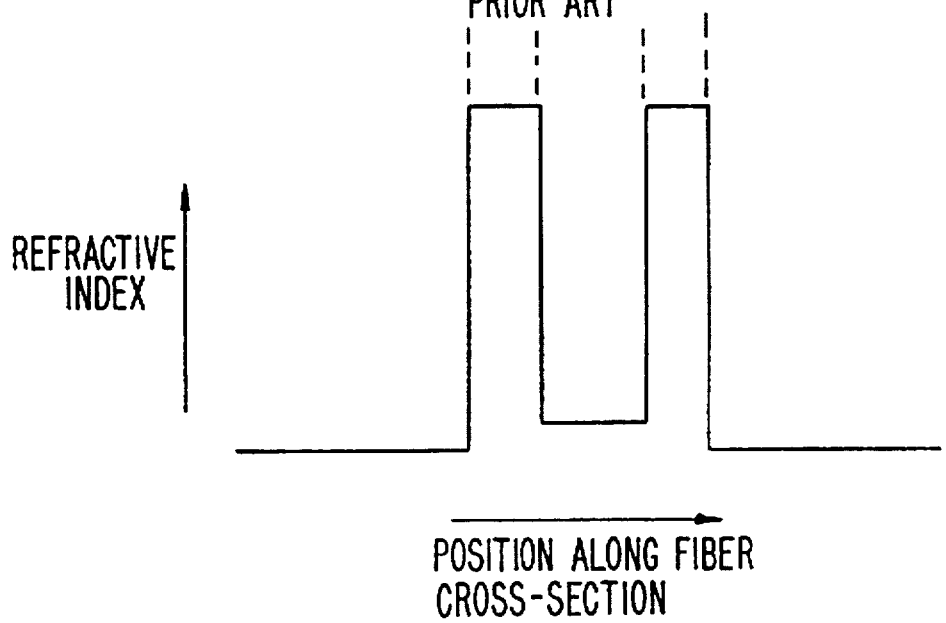
FIG. 2B (prior art) is a diagram illustrating a refractive index distribution of the fiber illustrated in FIG. 2A.

FIG. 2A is a diagram illustrating a cross-section of a different, conventional doped fiber, and FIG. 2B is a diagram illustrating a refractive index distribution of the fiber illustrated in FIG. 2A. Referring now to FIGS. 2A and 2B, the doped fiber includes a core 11 and a clad 12 around the core 11. Core 11 has a glass composition which includes a first region 14 doped with Er and Al, and a second region 13 around first region 14 and doped with Ge. The refractive index of second region 13 is sufficiently higher than the refractive index of clad 12 to provide a waveguide structure. The refractive index of first region 14 is a little higher than the refractive index of clad 12.

Al is only doped in the relatively narrow first region 1 Moreover, the Applicants have determined that a high enough concentration of Al cannot be effectively doped into the narrow first region 14. More specifically, according to an analysis of the Applicants, mutual diffusion occurs in the proximity of an interface between second region 13 and first region 14, resulting in low concentration of Al in first region 14.

Figure 3:
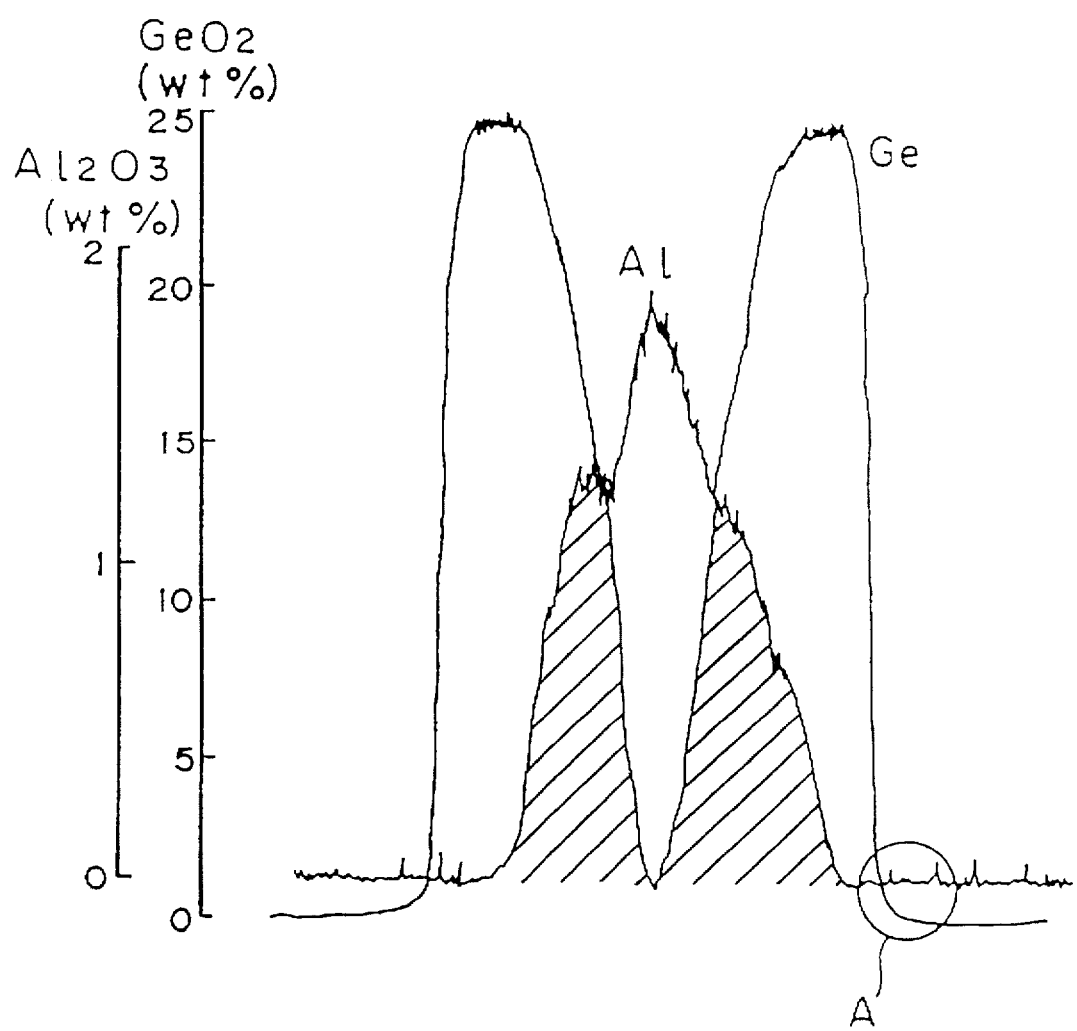
FIG. 3 is a graph illustrating concentration distributions of Ge and Al in a diametrical direction of the doped fiber illustrated in FIG. 2A when the amount of doped Al is relatively large.
Figure 4:
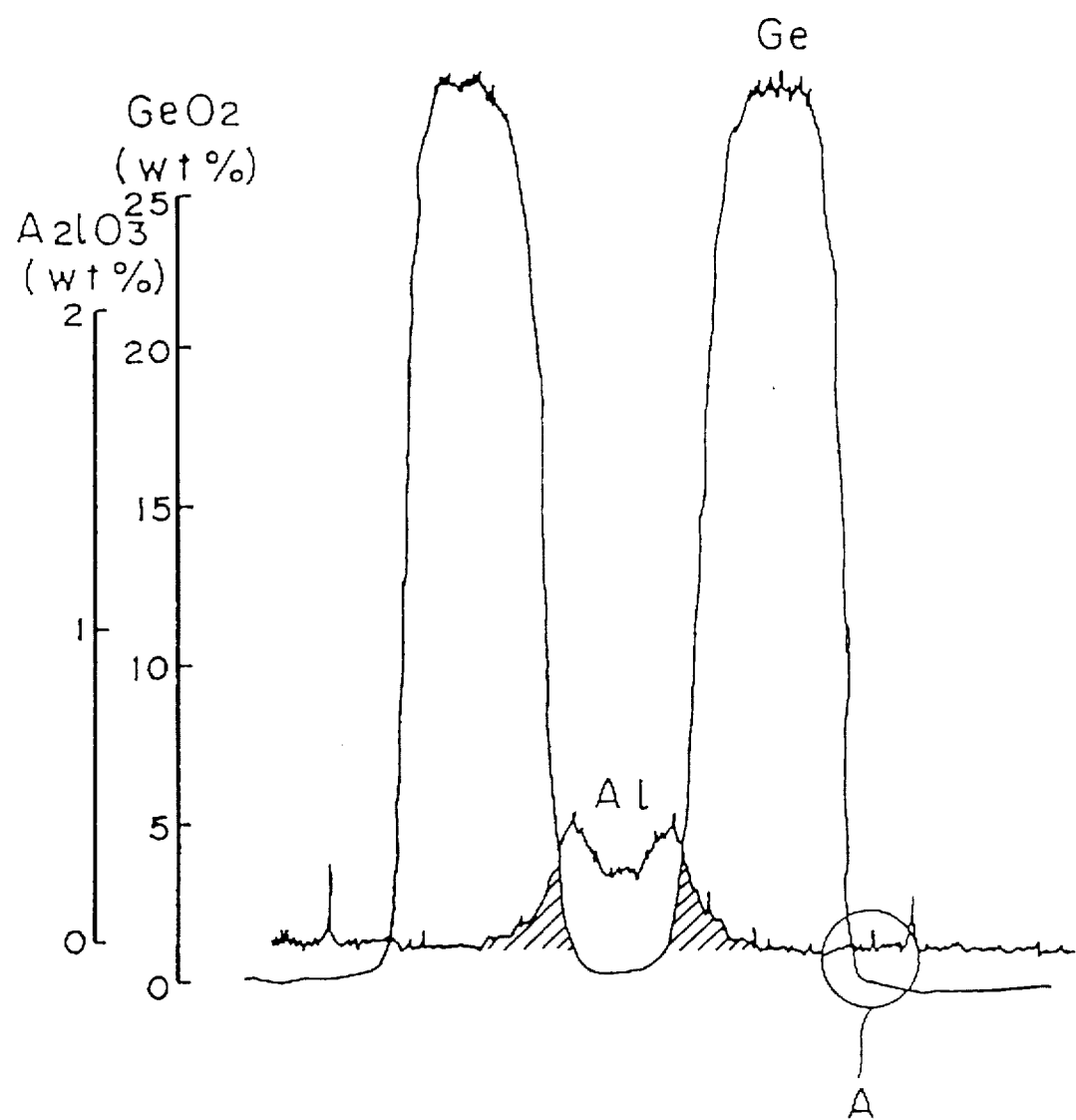
FIG. 4 is a graph illustrating concentration distributions of Ge and Al in a diametrical direction of the doped fiber illustrated in FIG. 2A when the amount of doped Al is relatively small.

FIG. 3 is a graph illustrating concentration distributions of Ge and Al in a diametrical direction of the doped fiber illustrated in FIG. 2A when the amount of doped Al in first region 14 of core 11 is relatively large, and FIG. 4 is a graph illustrating concentration distributions of Ge and Al in a diametrical direction of the doped fiber illustrated in FIG. 2A when the amount of doped Al in first region 14 of core 11 is relatively small. For detection of a dopant, a line analysis of a preform in a diametrical direction by an electron probe micro analyzer (EPMA) was employed. In FIGS. 3 and 4, graduations of weight percent (wt %) of $GeO_2$ and $Al_2O_3$ are applied to the axis of the ordinate.

Comparison between the concentration distributions of Ge in FIGS. 3 and 4 reveals that the diffusion of Ge from second region 13 to first region 14 appears in a greater amount when the amount of Al is large, as compared to the case when the amount of Al is small. Further, in a portion "A" (see FIGS. 3 and 4) in the proximity of an interface between core 11 and clad 12, the diffusion of Ge is very small in amount. Moreover, first region 14 has a higher dopant concentration than clad 12 and closely contacts second region 13 doped with Ge. Therefore, Ge is likely to be diffused into the high concentration first region 14 and Al is likely to be diffused from the high concentration first region 14 into second region 13, thereby resulting in low concentration of Al. Accordingly, the amplification band cannot be expanded effectively with the fiber illustrated in FIG. 2A.

Figure 5A:
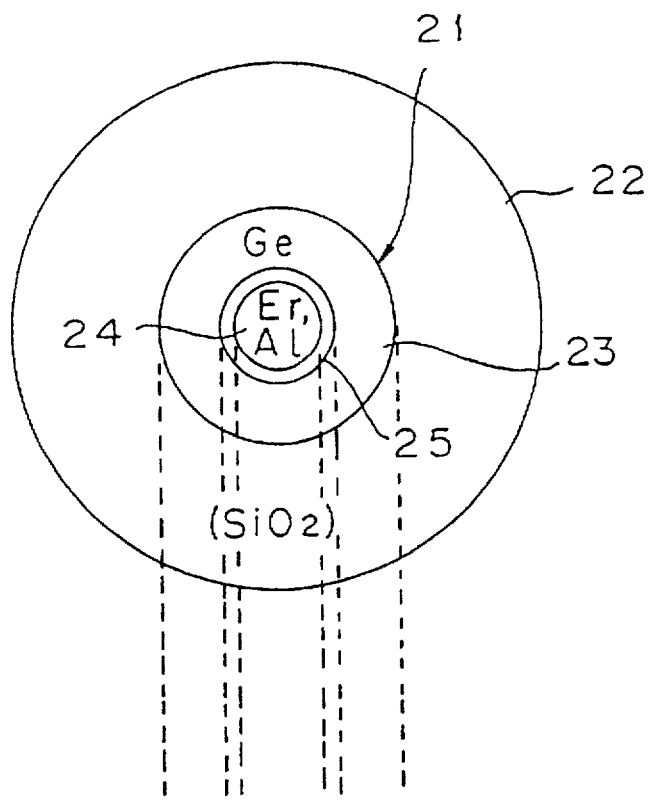
FIGS. 5A is a diagram illustrating a cross-section of a doped fiber, according to an embodiment of the present invention.
Figure 5B:
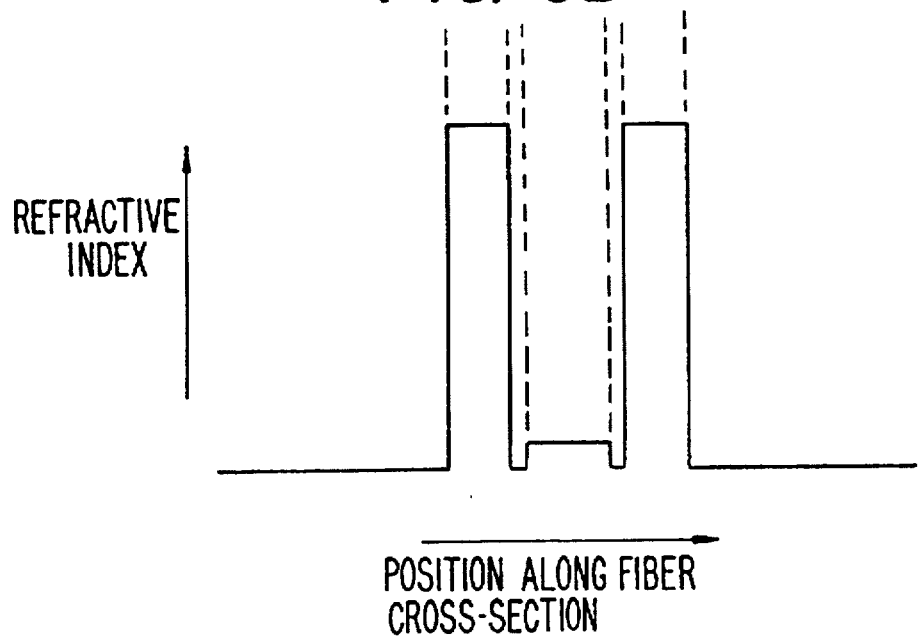
FIG. 5B is a diagram illustrating a refractive index distribution of the doped fiber illustrated in FIG. 5A, according to an embodiment of the present invention.

FIGS. 5A is a diagram illustrating a cross-section of a doped fiber, according to an embodiment of the present invention, and FIG. 5B is a diagram illustrating a refractive index distribution of the doped fiber illustrated in FIG. 5A, according to an embodiment of the present invention. Referring now to FIGS. 5A and 5B, the doped fiber shown includes a core 21 and a clad 22 around core 21. Core 21 is a glass composition which includes a first region 24 doped with Er and Al, a second region 25 around first region 24, and a third region 23 around second region 25 and doped with Ge. Second region 25 contains substantially no dopant and therefore has a low impurity concentration. Clad 22 also has substantially no dopant. Therefore, second region 25 has an impurity concentration which is lower than the concentration of the dopant (Ge) in third region 23 and is lower than the concentrations of the dopants (Er and Al) in first region 24.

The refractive index of third region 23 of core 21 is sufficiently higher than the refractive index of clad 22, to thereby provide a waveguide structure. The refractive index of first region 24 is a little higher than the refractive indices of second region 25 and clad 22 since first region 24 is suitably doped with Er and Al.

Therefore, in the glass composition of core 21, second region 25 has a similar impurity concentration to that of clad 22 and is interposed between third region 23 and first region 24. The effect of second region 25 is to prevent diffusion of Ge from third region 23 into first region 24 and diffusion of Al from first region 24 into third region 23 when producing the doped fiber or a preform thereof. Consequently, Er and Al can be confined to the individual narrow regions into which they are doped. As a result, a doped fiber can be provided with an expanded amplification band.

As an example of the relative refractive indices of the various regions, clad 22 and second region 25 can have no dopant and a refractive index n =1.45. Third region 23 can have, for example, a refractive index n which is in the range of 1.5% to 2.5%, higher than the refractive index of clad 22 and second region 25. Thus, third region would have a refractive index n =1.45+0.015(1.45), to n=1.45 +0.025 (1.45). First region 24 can have, for example, a refractive index which greater than the refractive index of clad 22 and second region 25, but not more than 0.3% higher. Thus, first region 24 would have a refractive index n which is greater than 1.45, but less than 1.45+0.003 (1.45). These refractive indices are not intended to limit the present invention, and are merely provided as examples.

Figure 6:
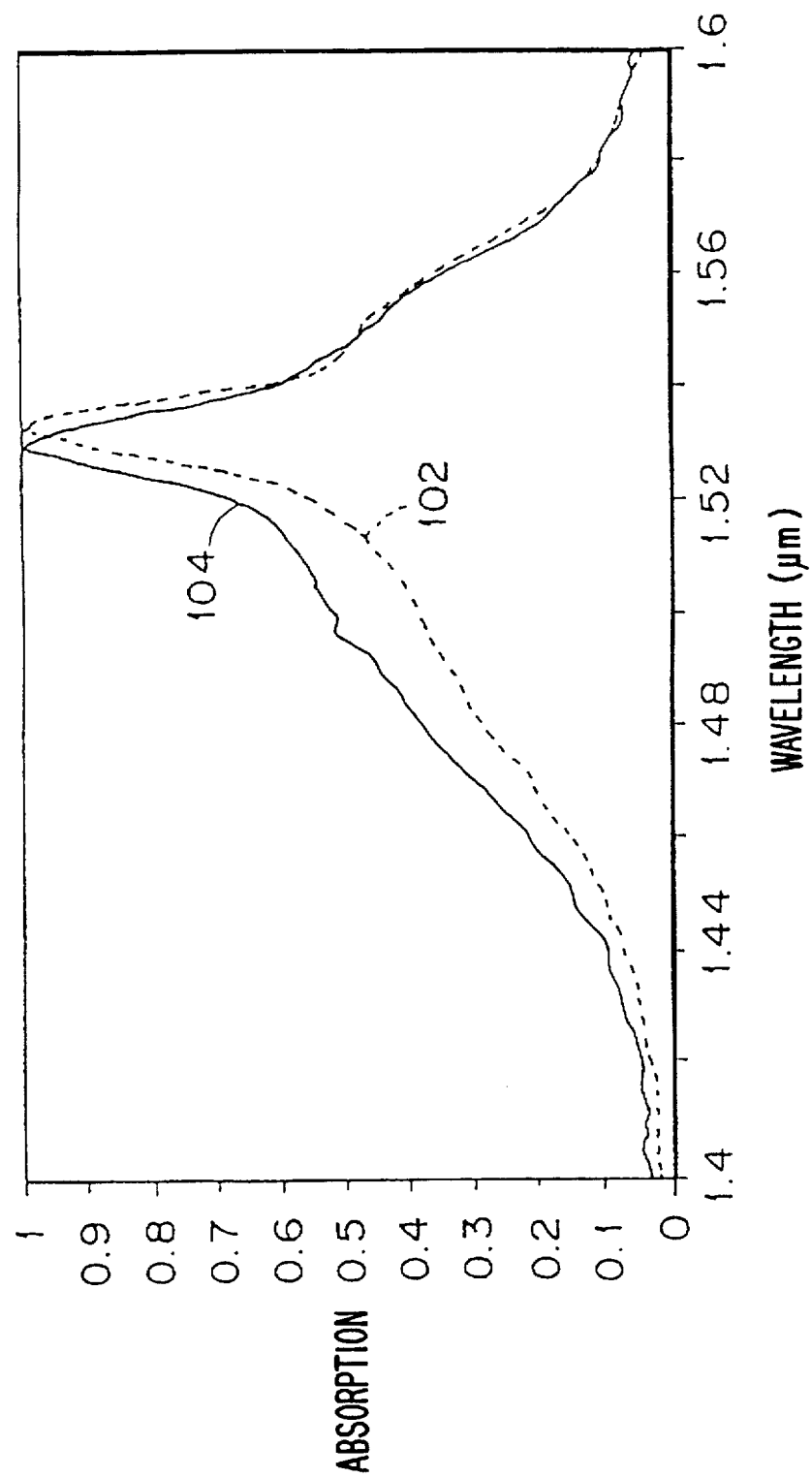
FIG. 6 is a graph illustrating a wavelength characteristic of absorption of the fiber illustrated in FIG. 5A, according to an embodiment of the present invention.

FIG. 6 is a graph illustrating a wavelength characteristic of absorption of the fiber illustrated in FIG. 5A, according to an embodiment of the present invention. In FIG. 6, the ordinate indicates the normalized value of the absorption amount when the maximum absorption amount is represented by "1", while the abscissa indicates the wavelength. Reference numeral 102 denotes a characteristic of the doped fiber of FIG. 1A, and reference numeral 104 denotes a characteristic of the doped fiber illustrated in FIG. 5A.

Figure 7:
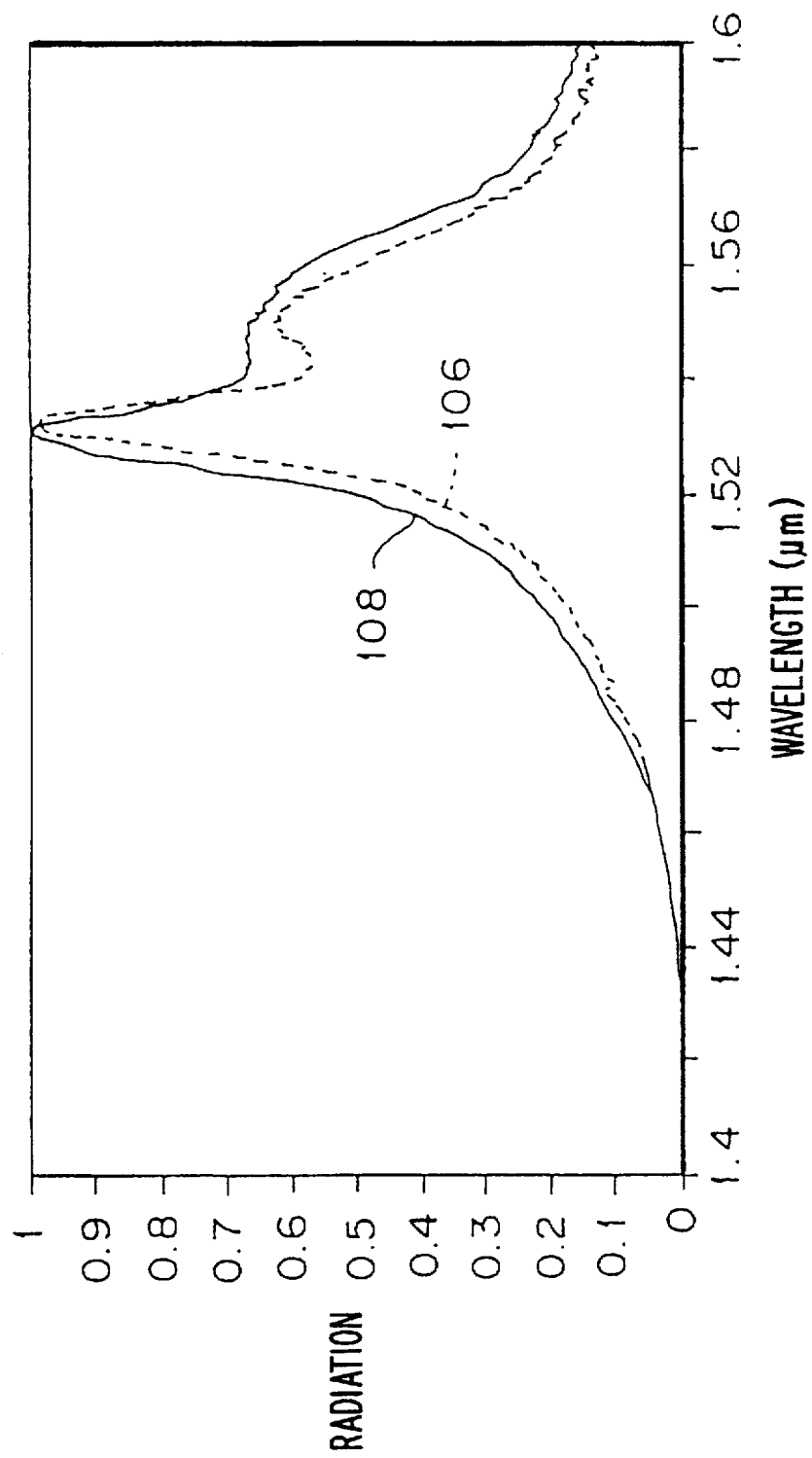
FIG. 7 is a graph illustrating a wavelength characteristic of radiation of the fiber illustrated in FIG. 5A, according to an embodiment of the present invention.

FIG. 7 is a graph illustrating a wavelength characteristic of radiation of the fiber illustrated in FIG. 5A, according to an embodiment of the present invention. In FIG. 7, the ordinate indicates the normalized value of the radiation amount when the maximum radiation amount is represented by "1", while the abscissa indicates the wavelength. The radiation in FIG. 7 is of amplified spontaneous emission light (ASE light) when pump light of the 0.98 μm band in wavelength is supplied to the doped fiber. Reference numeral 106 denotes a characteristic of the doped fiber of FIG. 1A, and reference numeral 108 denotes a characteristic of the doped fiber illustrated in FIG. 5A.

The graphs illustrated in FIGS. 6 and 7 can be compared to the wavelength characteristic of absorption and the wavelength characteristic of radiation of a conventional doped fiber. Generally, the wavelength characteristics of absorption and radiation indicate the wavelength characteristic of a low signal gain of the doped fiber. Accordingly, it can be seen from FIGS. 6 and 7 that the amplification band is expanded by the fiber illustrated in FIG. 5A, and that, as the concentration of doped Al increases, the amplification band is expanded.

Figure 8:
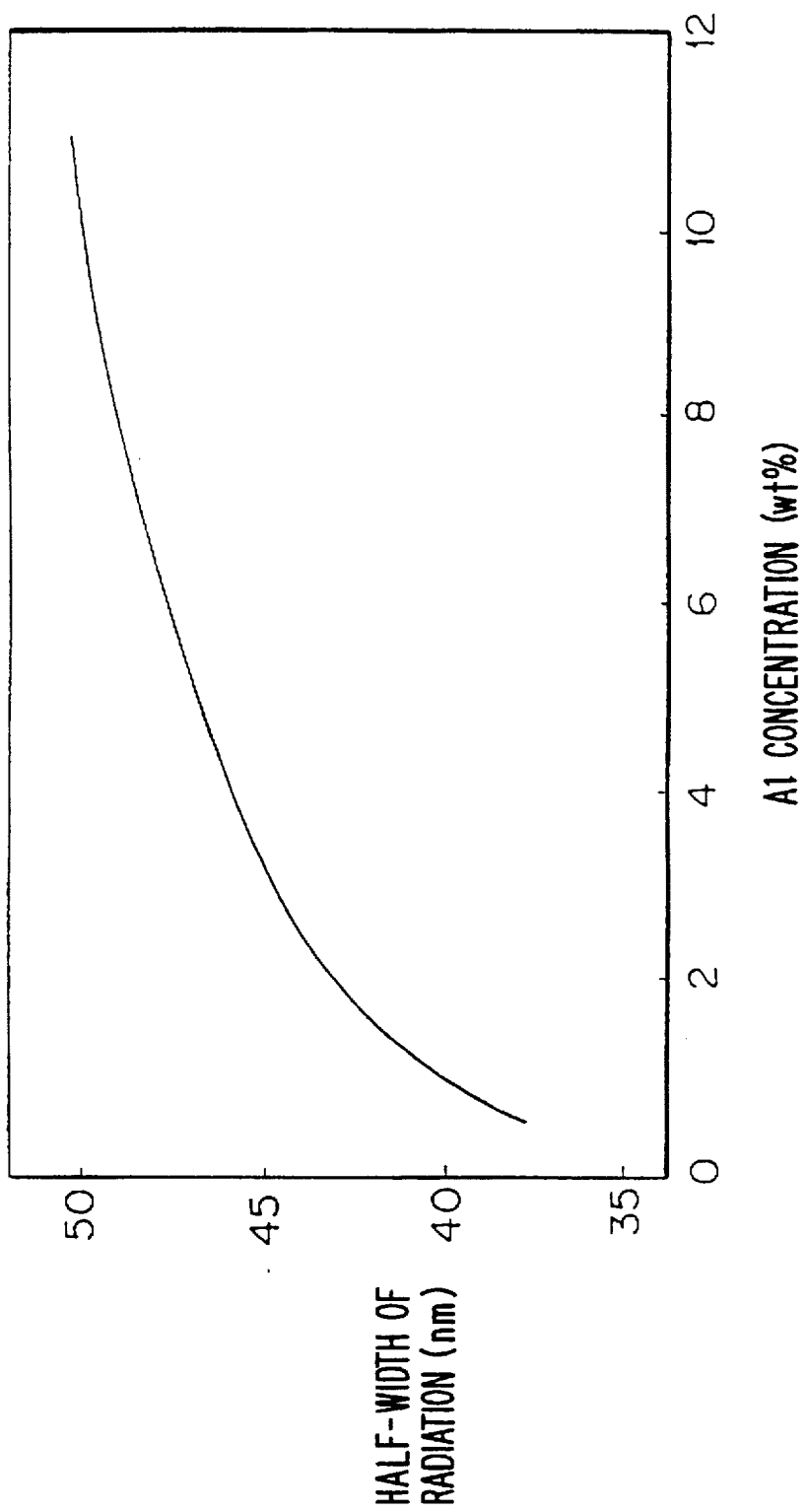
FIG. 8 is a graph illustrating the relationship between a half-width radiation and the concentration of doped Al, according to an embodiment of the present invention.

FIG. 8 is a graph illustrating the relationship between a half-width (nm) radiation and the concentration (wt %) of doped Al, according to an embodiment of the present invention. Referring now to FIG. 8, as the concentration of doped Al increases, the half-width of radiation increases, and the amplification band is expanded effectively. As previously described, it is preferable to have a high Al concentration to expand the amplification band. However, as illustrated in FIG. 8, the half-width of radiation becomes saturated as the concentration of Al increases past approximately 80,000 parts/million (ppm), which corresponds to an Al concentration of 8%.

Figure 9:
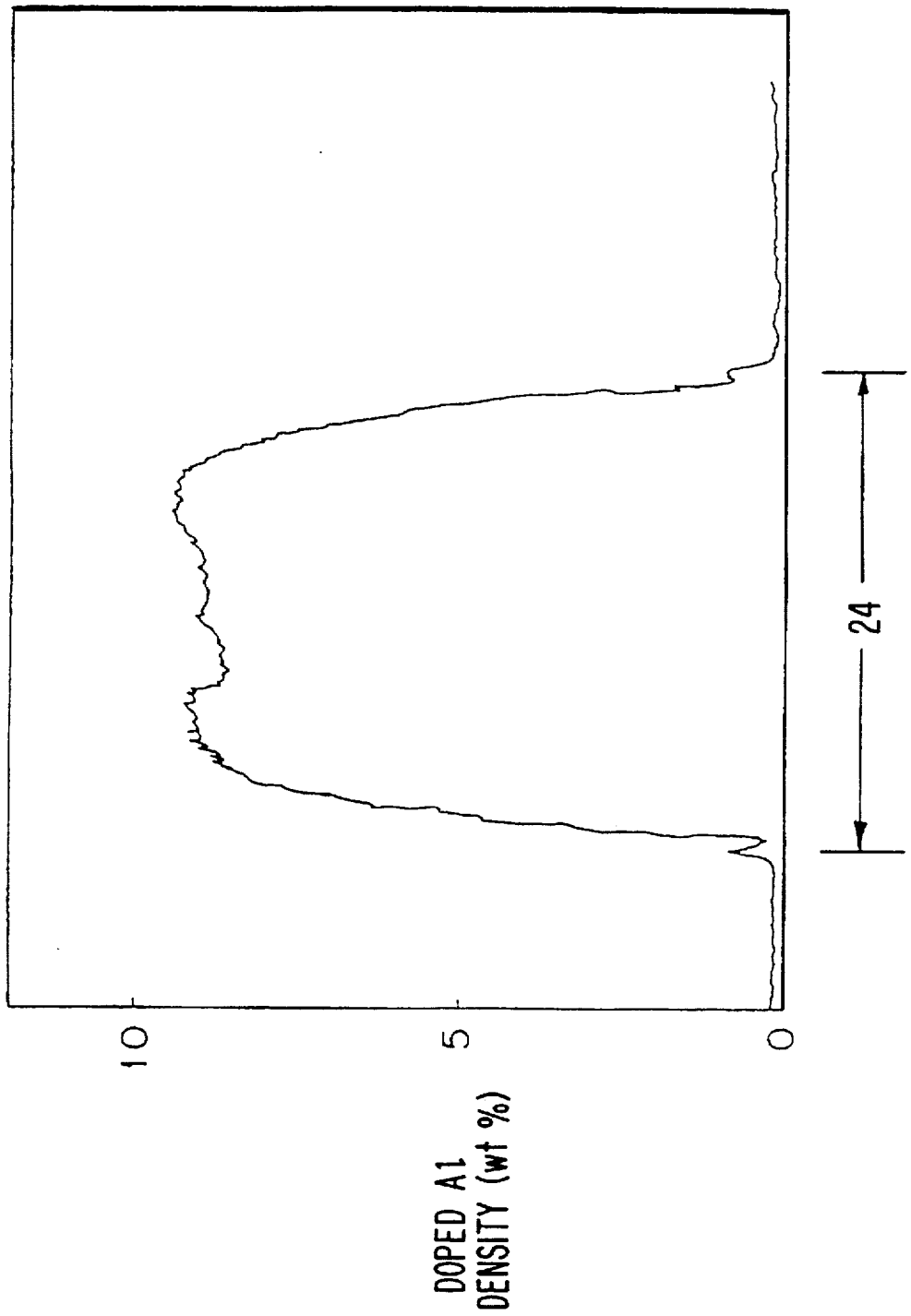
FIG. 9 is a graph illustrating a distribution of the concentration of doped Al in the fiber illustrated in FIG. 5A, according to an embodiment of the present invention.

FIG. 9 is a graph illustrating a distribution of the concentration of doped Al in the fiber illustrated in FIG. 5A, according to an embodiment of the present invention. Referring now to FIG. 9, the ordinate indicates the doped Al concentration by wt % of $Al_2O_3$, and the abscissa indicates the position of a preform in a diametrical direction. It can be seen that Al is confined in a comparatively high concentration in first region 24 (and 23 corresponding region of the preform in a strict sense) because of the presence of second region 25 (see FIG. 5A) acting as a barrier region. The doped Al concentration in first region 24 reaches approximately 10% and, consequently, effective expansion of the amplification band is possible. Also, a comparatively uniform doped concentration is obtained in first region 24.

A process of producing the doped fiber according to the above embodiments of the present invention may include the steps of producing a preform combining a Modified Chemical Vapor Deposition (MCVD) method and an impregnation method, and heating the preform to draw it into the doped fiber.

In the MCVD method, a reactive substance which vaporizes at a room temperature is used as the raw material gas. For example, $SiCl_4$ is used in order to obtain SiO of the principal component, and $GeCl_4$ is used in order to obtain $GeO_2$ for raising the refractive index.

The impregnation method is applied to doping of Er and Al for which a suitable reactive substance which sufficiently vaporizes at a room temperature cannot be obtained. For example, aqueous solution or alcoholic solution in which a chemical compound of a dopant of any of them is employed as a solute is used.

Figure 10:
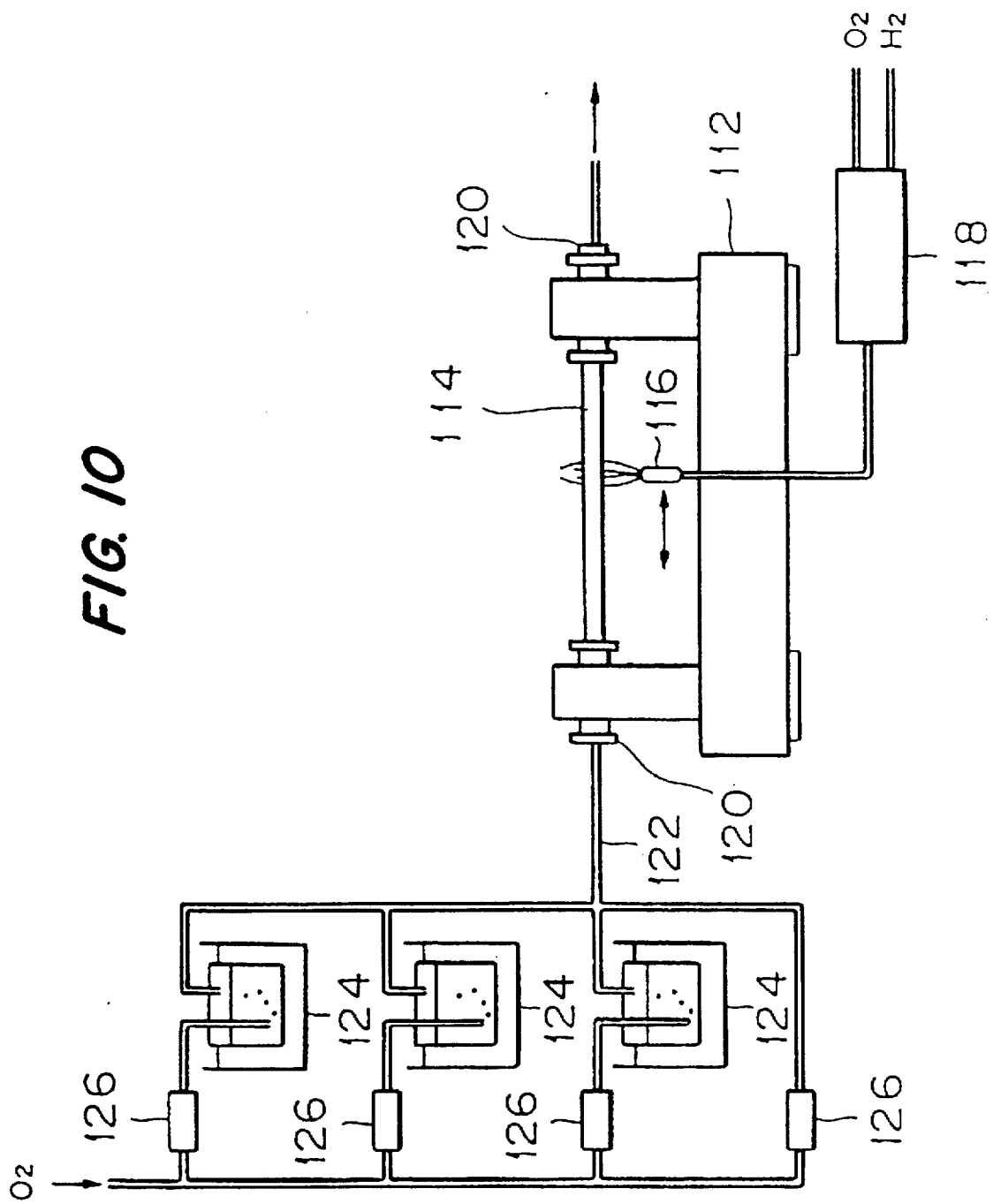
FIG. 10 is a diagram illustrating a preform production apparatus for producing a doped fiber, according to an embodiment of the present invention.

FIG. 10 is a diagram illustrating a preform production apparatus according to an embodiment of the present invention, for producing a doped fiber according to an embodiment of the present invention. Referring now to FIG. 10, a glass lathe 112 is for production of glass which supports a reaction tube 114 of quartz for rotation thereon. Reaction tube 114 is heated from the outside by a burner 116 which moves back and forth along a longitudinal direction of reaction tube 114. The flow rates of $O_2$ and $H_2$ to be supplied to burner 116 are adjusted by a temperature control apparatus 118. Lathe 112 has connectors 120 for supporting the opposite ends of reaction tube 114. A gas supply pipe 122 is connected to one of the connectors 120 so that raw material gas, such as $O_2$, is supplied into the inside of reaction tube 114 through supply pipe 122. A supply unit 124 is used to supply raw material gas, such as $SiCl_4$ or $GeCl_4$. The supply rate of the raw material gas is controlled by the flow rate of carrier gas, such as $O_2$, which is fed in via a mass flow meter 126.

Referring to FIG. 10, a process of producing the doped fiber Illustrated in FIG. 5A will now be described In detail. A core layer may be deposited on an inner wall of reaction tube 114 so that reaction tube 114 may make a clad. When it is intended to raise the purity of a portion of the clad in the proximity of the core to achieve reduction in loss, a clad layer is first deposited on the inner wall of reaction tube 114. In particular, while reaction tube 114 into which raw material gas ($SiCl_4$) and carrier gas are fed is rotated, reaction tube 114 is heated from the outside by burner 116. Moreover, when fine powder of oxide glass which contains $SiO_2$ as a principal component and is to make a clad is deposited in reaction tube 114, it is immediately vitrified by the heat by burner 116. The back and forth movement of burner 116 is repeated a plurality of times so that clad glass having a predetermined refractive index is formed uniformly on the inner wall of reaction tube 114. Then, adding $GeCl_4$ to the raw material gas, such back and forth movement of burner 116 is performed a plurality of times in a similar manner so that a layer corresponding to third region 23 (see FIG. 5A) doped with Ge Is formed. Thereafter, using the raw material gas which only includes $SiCl_4$ a layer corresponding to second region 25 whose impurity concentration is low is formed.

After the layer for second region 25 is formed, while the raw material gas remains and includes only $SiCl_4$, the heating temperature by burner 116 is dropped, and back and forth movement of burner 116 is performed a plurality of times. In this instance, since the heating temperature is comparatively low, fine powder of oxide glass deposited on the inner side of the layer for second region 25 is not fully vitrified into transparent class, but is converted into a porous (like soot) layer. The porous layer is impregnated with solution which contains a compound of Er and a compound of Al as solutes. After the impregnation, the solvent of the solution is removed by heating or some other suitable method. Doping of Er and doping of Al may be performed by separate processes from each other. The compound of each solute is, for example, a chloride of the substance. After the removal of the solvent, the layer doped with Er and Al is heated to fully vitrify the layer. Then, reaction tube 114 is heated at a higher temperature to perform collapse thereof. As a result, a preform is obtained. The vitrification of the porous layer and the collapse may be performed at a time.

In a production process as described above for a preform, since a porous layer for impregnation is formed after the layers for third region 23 and second region 25 are fully vitrified, upon the vitrification of the porous layer or the collapse, the layer for second region 25 acts as a barrier layer to prevent mutual diffusion of Ge and Al.

A doped fiber can be obtained by drawing the thus obtained preform. Also, in this drawing line process, second region 25 functions as a barrier layer so that mutual diffusion of Ge and Al is Prevented. With the doped fiber obtained, since co-doping of Ge and Al is prevented in this manner, an optical amplifier having a wide amplification band can be constructed using the doped fiber.

Figure 11A:
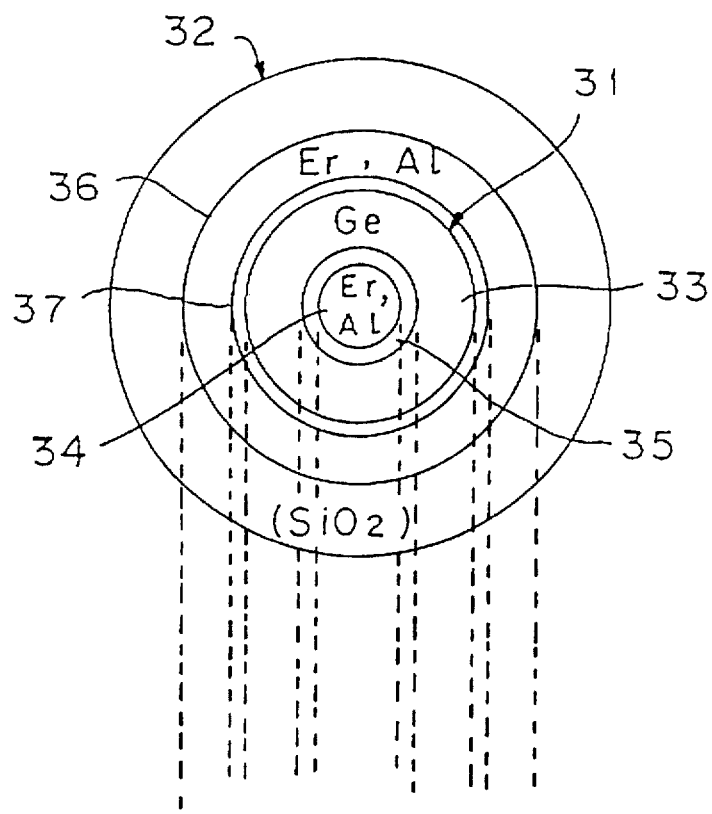
FIG. 11A is a diagram illustrating a cross-section of a doped fiber, according to an additional embodiment of the present invention.
Figure 11B:
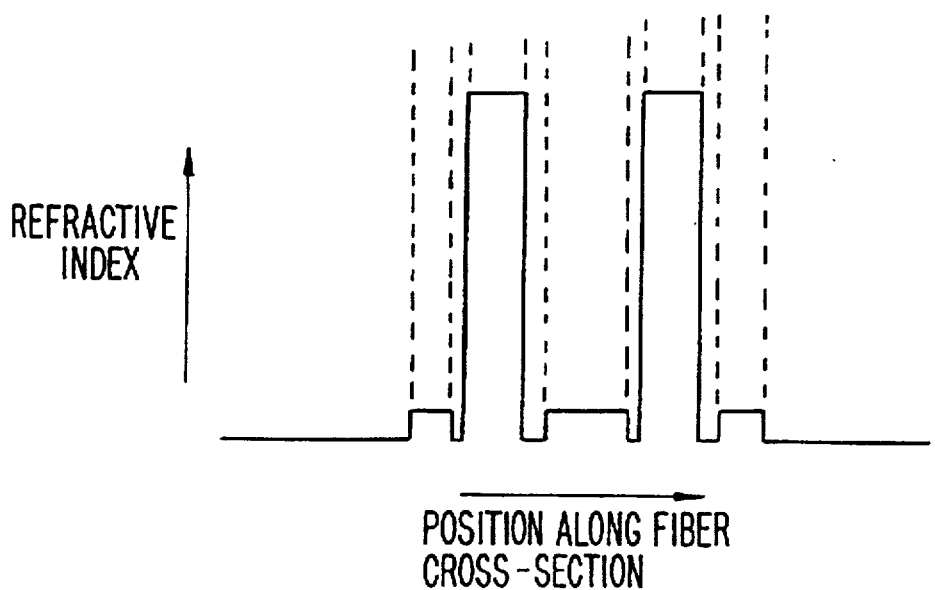
FIG. 11B is a diagram illustrating a refractive index distribution of the fiber illustrated in FIG. 11A, according to an embodiment of the present invention.

FIG. 11A is a diagram illustrating a cross-section of a doped fiber, according to an additional embodiment of the present invention, and FIG. 113 is a diagram illustrating a refractive index distribution of the fiber illustrated in FIG. 11A, according to an embodiment of the present invention. Referring now to FIGS. 11A and 11B, a fiber includes a core 31 and a clad 32 around core 31. Core 31 is a glass composition having a first region 34 doped with Er and Al, a second region 35 around first region 34, and a third region 33 around second region 35 and doped with Ge. Second region 35 contains no dopant so that it has a low impurity concentration. Clad 32 is a glass composition which includes a first region 37 around core 31, and a second region 36 around first region 37 and doped with Er and Al. First region 37 contains no dopant so that it has a low impurity concentration. Therefore, first region 37 of clad 32 has an impurity concentration which is lower than the concentration of the dopant (Ge) in third region 33 of core 31, lower than the concentrations of the dopants (Er and Al) in first region 34 of core 31, and lower than the concentrations of the dopants (Er and Al) in second region 36 of clad 32.

Since Ge is doped in third region 33 of core 31, the refractive index of third region 33 is sufficiently higher than the refractive index of clad 32, to thereby provide a waveguide structure.

The structural arrangement of the various regions of core 31 is similar to the structural arrangement of regions of core 21 illustrated in FIG. 5A, but the concentrations of doped Er and Al in first region 34 of core 31 in FIG. 11A are set lower than the concentrations of doped Er and Al in first region 24 of core 21 in FIG. 5A. Instead, in the fiber illustrated in FIG. 11A, second region 36 doped with Er and Al is provided in clad 32.

Where a doped fiber is of the single mode type, the electric field amplitude of light guided by the fiber generally exhibits a maximum value at the center of the core and gradually decreases away from the center. The electric field amplitude exhibits a Gaussian distribution, and the periphery thereof overlaps with a portion of the clad in the proximity of the core. In the embodiment of the present invention illustrated in FIG. 11A, since Er and Al can be distributed over a wide range in the Gaussian distribution, an amplification action can be achieved without greatly increasing the concentrations of doped Er and Al. As a result, the loss of the doped fiber is reduced, pumping of a longer doped fiber can be achieved by pump light of a specific power and effective optical amplification can be achieved.

Therefore, second region 35 of core 31 and first region 37 of clad 32 each have low impurity concentrations arid are provided on the inner side and the outer side of third region 33 doped with Ge. As a result, diffusion of dopants in a process for producing the doped fiber can be prevented, to thereby prevent co-doping of Ge and Al. Upon production of a preform for the doped fiber, it is only required to change the order of the MCVD method and the impregnation method in the first embodiment. Therefore, detailed description of the process for producing a preform for the doped fiber is omitted here.

Figure 12A:
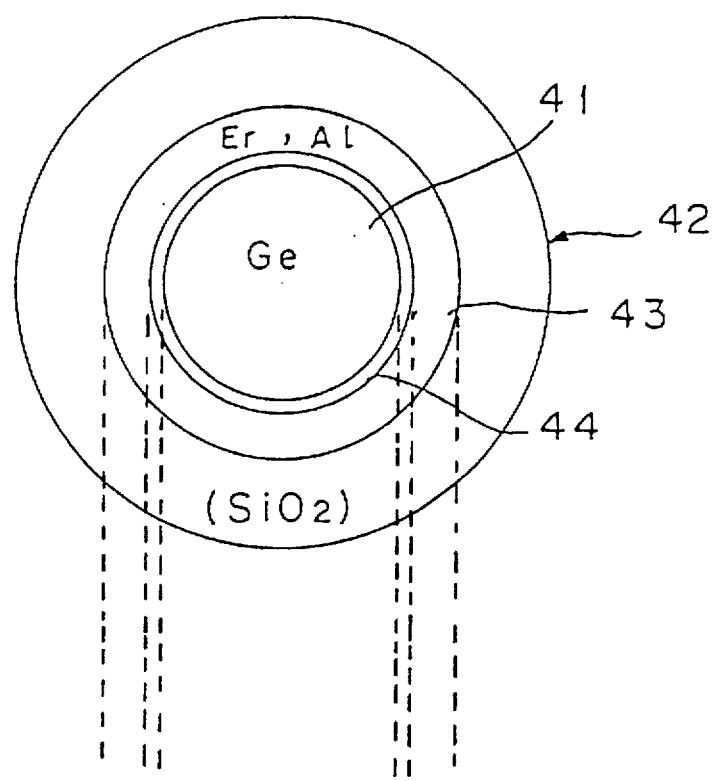
FIG. 12A is a diagram illustrating a cross-section of a doped fiber, according to a further embodiment of the present invention.
Figure 12B:
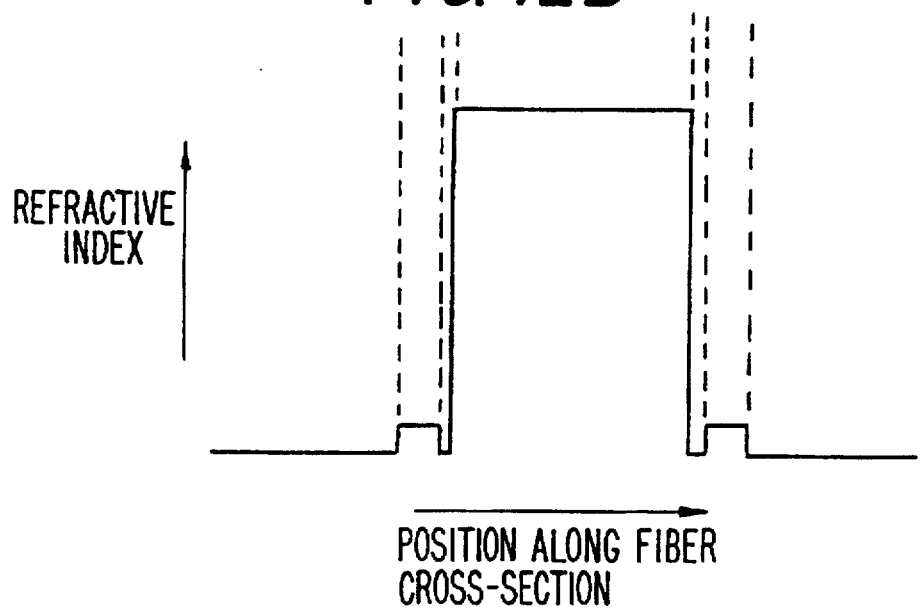
FIG. 12B is a diagram illustrating a refractive index distribution of the fiber illustrated in FIG. 12A, according to an embodiment of the present invention.

FIG. 12A is a diagram illustrating a cross-section of a doped fiber, according to a further embodiment of the present invention, and FIG. 12B is a diagram illustrating a refractive index distribution of the fiber illustrated in FIG. 12A, according to an embodiment of the present invention. Referring now to FIGS. 12A and 12B, a doped fiber includes a core 41 and a clad 42 around core 41. Core 41 is a glass composition containing Ge. Clad 42 is a glass composition having a first region 44 around core 41 and a second region 43 around first region 44 and doped with Er and Al. First region 44 contains no dopant so that it has a low impurity concentration. Therefore, first region 44 has an impurity concentration which is lower than the concentration of the dopant (Ge) in core 41, and is lower than the concentrations of the dopants (Er and Al) in second region 43. Since Ge is doped in core 41, the refractive index of core 41 is sufficiently higher than the refractive index of clad 42, to thereby provide a waveguide structure.

In the embodiment of the present invention as illustrated in FIG. 12A, Er and Al are not doped in a portion at which the electric field amplitude of light guided by the doped fiber is at a maximum. Instead, Er and Al are doped in a region (second region 43) at which the electric field amplitude is comparatively small. Consequently, the length of a doped fiber pumped by pump light of a specific cower can be increased. As a result, efficient optical pumping of the doped fiber can be achieved.

Further, since first region 44 has a low impurity concentration and is provided between core 41 and second region 43 of clad 42, mutual diffusion of Ge and Al can be prevented in a process for producing the doped fiber. As a result, efficient expansion of the amplification band can be achieved.

Figure 13A:
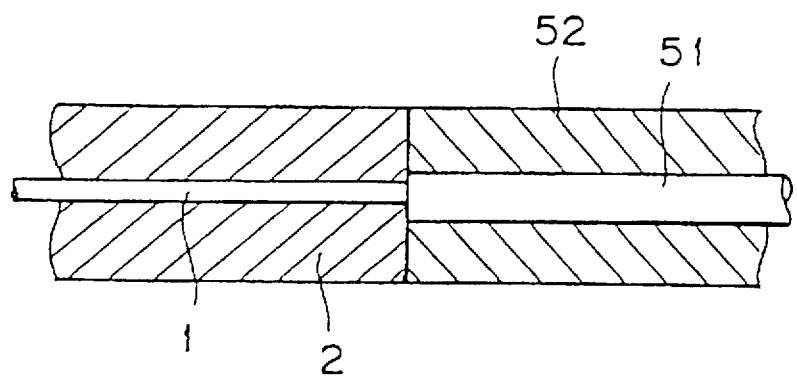
FIGS. 13A (prior art) and 13B (prior art) are diagrams illustrating a conventional splicing method for splicing a doped fiber to another fiber.
Figure 13B:
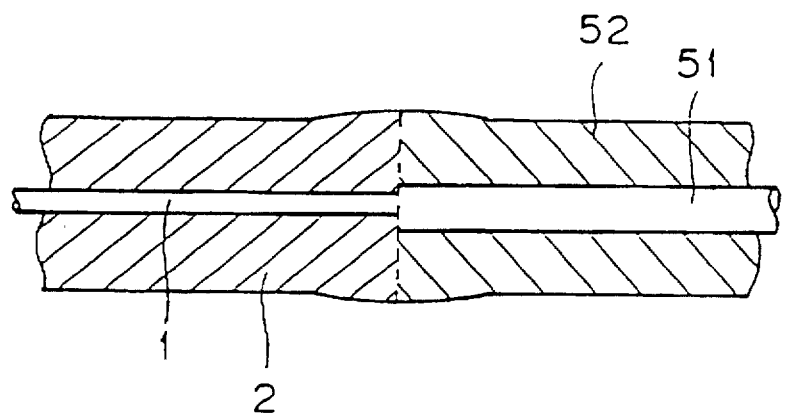

FIGS. 13A and 13B are diagrams illustrating a conventional splicing method for splicing a doped fiber to another fiber. Referring now to FIG. 13A, a first fiber in the left side of the figure is the doped fiber illustrated in FIG. 1A and has a core 1 of a comparatively small diameter doped with Ge, Er and Al. A second fiber is illustrated in the right side in FIG. 13A. The first and second fibers in FIG. 13A are to be spliced together. The second fiber includes a core 51 having a comparatively large diameter, and a clad 52 around the core 51.

The diameter of the core 1 is smaller than, for example, 3 μm, and the diameter of the core 51 is normally larger than 5 μm. The core diameter of the first fiber is made small to concentrate the power of pump light and thereby allow efficient optical amplification.

FIG. 13B shows the first and second fibers after being spliced together. As illustrated in FIB. 13B, the difference in core diameters causes a core discontinuity at the connection of the two fibers. The core discontinuity produces an undesirable loss of approximately 1 to 2 dB.

Figure 14A:
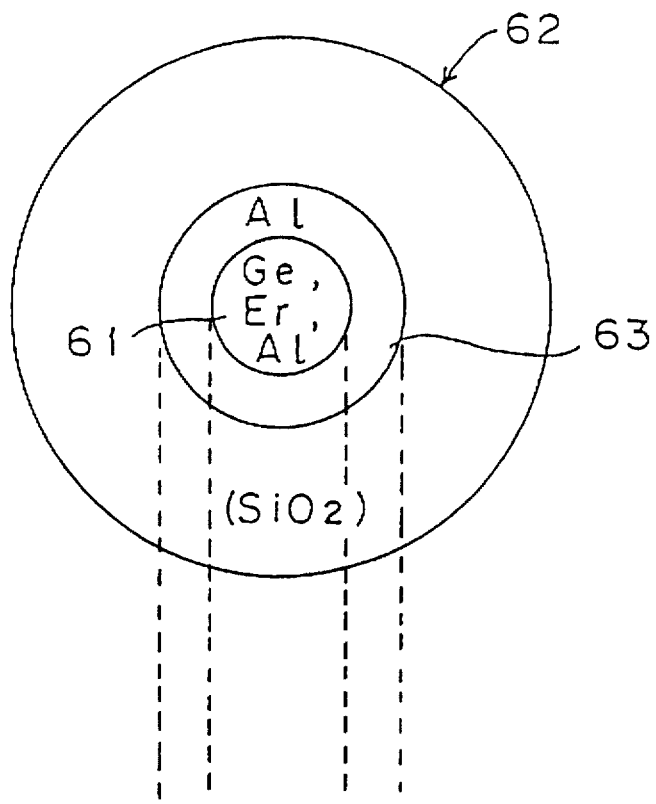
FIG. 14A is a diagram illustrating a cross-section of a doped fiber, according to an additional embodiment of the present invention.
Figure 14B:
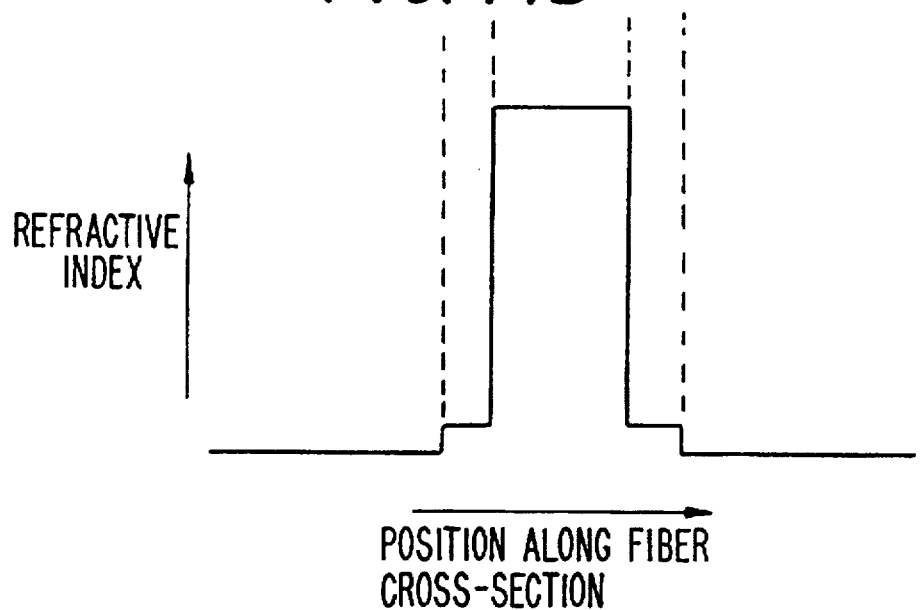
FIG. 14B is a diagram illustrating a refractive index distribution of the fiber illustrated in FIG. 14A, according to an embodiment of the present invention.

FIG. 14A is a diagram illustrating a cross-section of a doped fiber, according to an additional embodiment of the present invention, and FIG. 14B is a diagram illustrating a refractive index distribution of the fiber illustrated in FIG.

14A, according to an embodiment of the present invention. As will be discussed in more detail below, the fiber illustrated in FIG. 14A will allow the fiber to be spliced to another fiber without producing a large core discontinuity at the connection point of the two fibers.

Referring now to FIGS. 14A and 14B, a doped fiber includes a core 61 and a clad 62 around core 61. Core 61 is a glass composition containing Ge, Er and Al. Clad 62 is a glass composition which includes a diffusion region 63 containing a dopant of a concentration substantially equal to the concentration of Al doped into core 61. Diffusion region 63 is provided directly on the outer side of core 61. To simplify the process of producing a preform for the fiber, the dopant in diffusion region 63 is preferably Al, which is also a dopant in core 61. Since Ge is doped in core 61, the refractive index of core 61 is sufficiently higher than the refractive index of clad 62, to thereby provide a waveguide structure.

Moreover, instead of having core 61, the fiber illustrated in FIG. 14A can have a core as illustrated in FIG. 11A. More specifically, in FIG. 14A, core 61 can be replaced with core 31 of FIG. 11A.

Figure 15A:
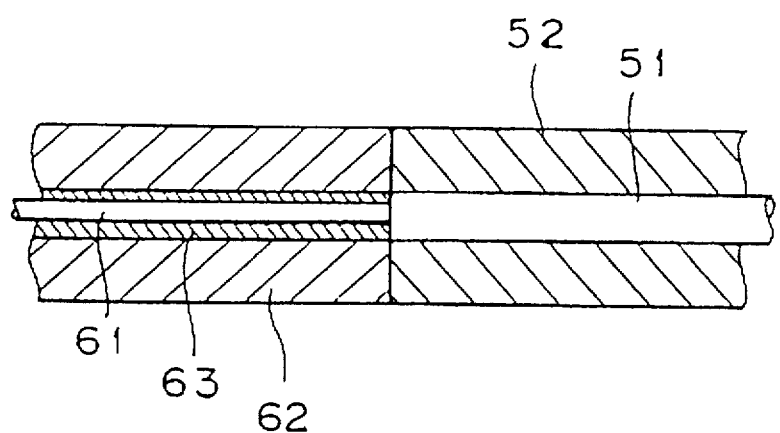
FIGS. 15A and 15B are diagrams illustrating a splicing method for splicing a doped fiber, as illustrated in FIG. 14A, to another fiber, according to an embodiment of the present invention.
Figure 15B:
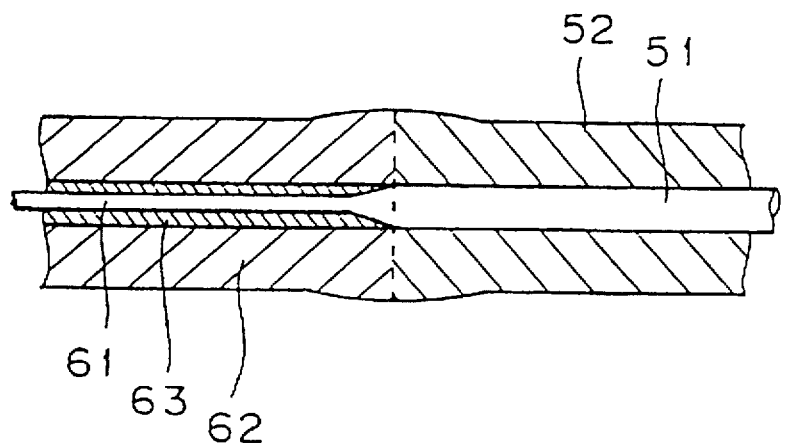

FIGS. 15A and 15B are diagrams illustrating a splicing method for splicing a doped fiber, as illustrated in FIG. 14A, to another fiber, according to an embodiment of the present invention. Referring now to FIG. 15A, a first fiber in the left side of the figure is the doped fiber illustrated in FIG. 14A. A second fiber is illustrated in the right side in FIG. 15A. The diameter of core 61 of the first doped fiber is smaller than the diameter of core 51 of the second fiber, and the outer diameter of the diffusion region 63 of the first doped fiber is substantially equal to the diameter of core 61 of the second fiber.

First, the two fibers are contacted at end faces thereof with each other, as shown in FIG. 15A. Then, portions of the fibers in the proximity of the end faces thereof in a mutually contacting condition are locally heated, for example, by arc discharge. The arc discharge is generated between opposing electrodes of an ordinary splicing apparatus. The splicing is completed as shown in FIG. 15B, by cooling the heated portions of the fibers.

Upon local heating of the portions of the fibers in the proximity of the end faces, diffusion region 63 allows a high refraction index region of the doped fiber to substantially expanded in the proximity of the joined end face. Consequently, the diameter of core 61 of the doped fiber increases continuously toward the joined end face. In particular, the extremity of diffusion region 63 of the doped fiber exhibits a generally inverted conical shape. This effect occurs since the heating for splicing causes Ge (which provides an increase in refractive index) to be thermally diffused from core 61 into diffusion region 63 to substantially increase the diameter of core 61. Further, the diameter of core 61 of the doped fiber varies continuously after being spliced because a temperature gradient is produced upon splicing. The temperature gradient refers to a temperature drop as the distance from the center of heating is increased.

Therefore, since the core diameter does not readily suffer from a discontinuity at a splicing point, the connection loss is reduced. As a result, the above embodiments of the present invention allow the connection loss to be reduced, for example, to 0.0 dB to 0.4 dB.

Figure 16A:
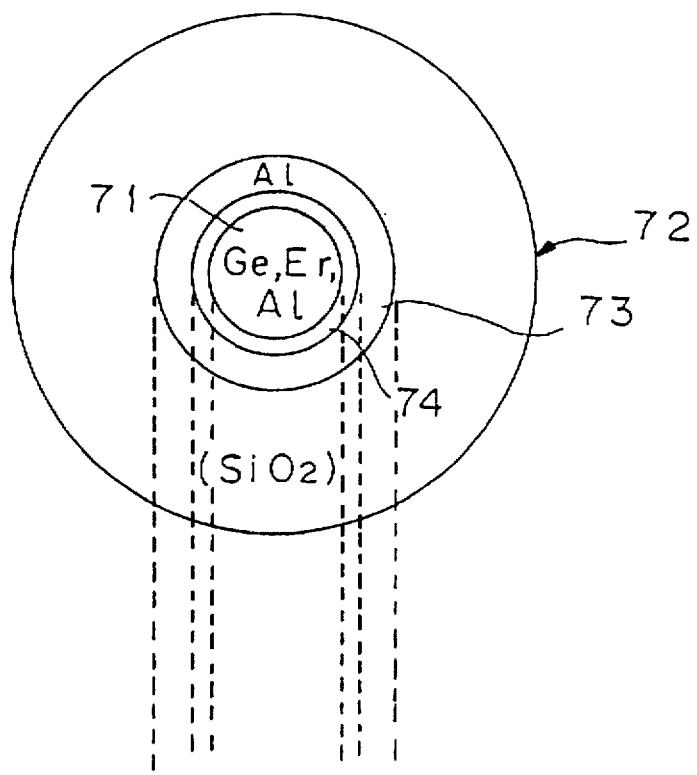
FIG. 16A is a diagram illustrating a cross-section of a doped fiber, according to an embodiment of the present invention.
Figure 16B:
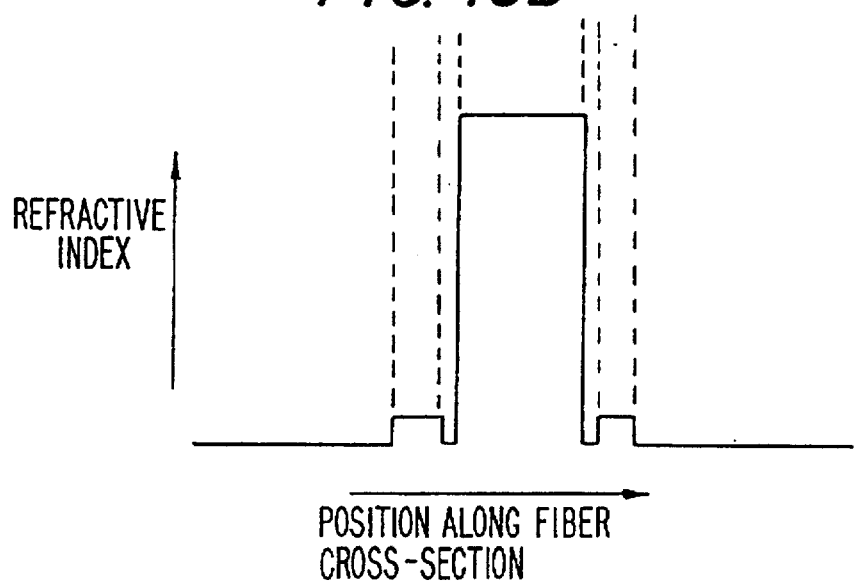
FIG. 16B is a diagram illustrating a refractive index distribution of the fiber illustrated in FIG. 16A, according to an embodiment of the present invention.

FIG. 16A is a diagram illustrating a cross-section of a doped fiber, according to an embodiment of the present invention, and FIG. 16B is a diagram illustrating a refractive index distribution of the fiber illustrated in FIG. 16A, according to an embodiment of the present invention. Referring now to FIGS. 16A and 16B, a doped fiber includes a core 71 and a clad 72 around the core 71. Core 71 is a glass composition containing Ge, Er and Al. Clad 72 is a glass composition which includes a barrier region 74 around core 71, and a diffusion region 73 around barrier region 74. Diffusion region 73 is in the proximity of core 71, and contains Al. Barrier region 74 has an impurity concentration lower than the concentration of any dopant in the fiber. Therefore, barrier region 74 has an impurity concentration which is lower than the concentration of each dopant (Ge, Er and Al) in core 71, and is lower than the concentration of the dopant (Al) in diff-usion region 73. Since Ge is doped in core 71, the refractive index of core 71 is sufficiently higher than the refractive index of clad 72, to provide a waveguide structure.

Preferably, the barrier region 74 is set to meet the following two requirements: (1) the thickness of the barrier region 74 is thick enough so that Al of diffusion region 73 will not diffuse to core 71 during the MCVD and heating for drawing upon production of the doped fiber, and (2) the barrier region 74 is thin enough so that Ge of core 71 is caused to diffuse to diffusion region 73 from core 71 by local heating upon splicing of the doped fiber to another fiber. When the splicing method of the present invention as described with reference to FIGS. 15A and 15B is applied to a fiber illustrated in FIG. 16A, the connection loss can be reduced. Of the two requirements for barrier region 74, the first requirement is employed to prevent the diameter of a portion of the doped fiber which has a high refractive index and substantially acts as a core from becoming different from a designed value therefor. The second requirement for barrier region 74 is for reducing the connection loss when the splicing method of the present invention is employed.

In FIG. 16A, the structure of core 21 in FIG. 5A may be adopted in place of core 71. In this instance, since barrier region 74 is present between third region 23 of core 21 doped with Ge and diffusion region 73, a doped fiber which can be applied to the splicing method of the present invention and has an amplification band which can be expanded effectively can be provided.

Figure 17:
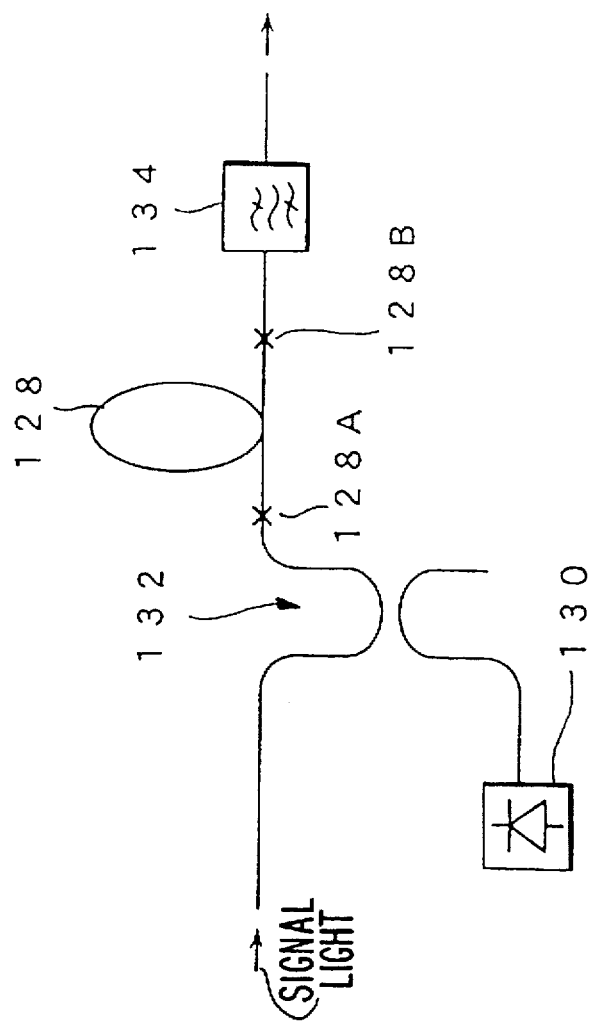
FIG. 17 is a diagram illustrating an optical amplifier, according to an embodiment of the present invention.

FIG. 17 is a diagram illustrating an optical amplifier, according to an embodiment of the present invention. Referring now to FIG. 17, the optical amplifier includes a doped fiber 128 having a first end 128A and a second end 128B, a pump light source 130 produced pump lght, and an optical coupler 132 of the wavelength division multiplexing (WDM) type. Doped fiber 128 can be any of the fibers of the above embodiments of the present invention. For example, doped fiber 128 can be the fiber illustrated in FIG. 5A, 11A, 12A, 14A or 16A. A laser diode is employed for pump light source 130, and the wavelength of pump light is, for example, within the 0.98 μm band.

Optical coupler 132 has four ports. One port is provided with signal light of the 1.55 μm band in wavelength, one port is connected to pump light source 130 to receive pump light, one port is connected to first end 128A of doped fiber 128, and the remaining port is formed as a non-reflective termination.

Signal light is introduced into doped fiber 128 through first end 128A by optical coupler 132, and pump light is coupled to the signal light by optical coupler 132 and is similarly introduced into doped fiber 128 through first end 128A. When the signal light is guided by doped fiber 128 while doped fiber 128 is optically pumped by the pump light, the signal light is amplified in accordance with the principle of stimulated emission of radiation. More specifically, as the signal fight propagates through doped fiber 128, the pump light interacts with, and thereby amplifies, the signal light. The amplified signal light is output from second end 128B of doped fiber 128. The amplified signal light is passed to an optical band-pass filter 134 and then provided to an optical transmission line (not illustrated).

When doped fiber 128 has, or example, a structure as shown in FIG. 5A, the optical amplifier will have a relatively wide amplification band and a relatively small gain tilt. When doped fiber 128 has a structure as shown in FIG. 14A and the splicing method illustrated by FIGS. 15A and 15B is applied to connection of the first end 128A and/or the second end 128B, the optical amplifier exhibits a relatively low connection loss and accordingly has a relatively high gain.

While the optical amplifier illustrated in FIG. 17 is of the forward pumping type wherein signal light and pump light are guided in the same direction in the doped fiber, another optical amplifier of the backward pumping type wherein signal light and pump light are guided in the opposite directions to each other in the doped fiber may be adopted instead.

According to the above embodiments of the present invention, erbium (Er) is used as a dopant for providing an amplification band by optical pumping. Er is a rare earth element. The present invention is not intended to be limited to doping with Er to provide an amplification band. For example, other rare earth elements can be used to provide an amplification band in an optical fiber. Known rare earth elements are, for example, La, Ce, Pr, Nd, Pm, Sm, Eu, Gd, Tb, Dy, Ho, Tm, Yb and Lu.

Various regions are described herein as being a "glass composition". For example, the core of various fibers is described as being a glass composition. However, the present invention is not necessarily intended to be limited to a glass composition. For example, it may be possible to produce a fiber having a plastic composition.

The above embodiments of the present invention relate to an optical fiber and a preform for the optical fiber. Thus, the term "optical fiber" is intended to also refer to a preform for producing the optical fiber. Moreover, optical fibers, preforms and optical amplifiers are "optical devices". Thus, the term "optical device" can refer to an optical fiber, a preform and/or an optical amplifier.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical device comprising:

a core for propagating light, the core include first, second and third regions each having a corresponding refractive index, the first, second and third regions being concentrically arranged with the second region around the first region and the third region around the second region, wherein the refractive index of the third region is higher than the refractive index of the first region, and the refractive index of the first region is higher than the refractive index of the second region, wherein the third region includes a dopant for providing the refractive index of the third region, the first region includes a first dopant for providing an amplification band and a second dopant for expanding the amplification band, and the second region has an impurity concentration which is lower than the concentration of the dopant in the third region and is lower than the concentrations of the first and second dopants in the first region.

2. An optical device as in claim 1, further comprising:

a clad around the core, the clad having a refractive index distribution which causes the core and clad to function together as a waveguide.

3. An optical device as in claim 2, wherein the core and clad form an optical fiber which propagates light therethrough, the optical device further comprising:

a light source providing amplifying light to the optical fiber so that the amplifying light interacts with, and thereby amplifies, the light propagating through the optical fiber.

4. An optical device as in claim 1, wherein the first dopant in the first region is a rare earth material.

5. An optical device as in claim 1, wherein the dopant of the third region is germanium, and the first and second dopants of the first region are erbium and aluminum, respectively.

6. An optical device as in claim 1, further comprising:

a clad around the core and including first and second regions concentrically arranged around the core with the first region of the clad being between the core and the second region of the clad, wherein the first region of the clad has a refractive index which is less than the refractive index of the first region of the core, and the second region of the clad has a refractive index which is larger then the refractive index of the first region of the clad and lower than the refractive index of the third region of the core.

7. An optical device as in claim 6, wherein the core and clad form an optical fiber which propagates light therethrough, the optical device further comprising:

a light source providing amplifying light to the optical fiber so that the amplifying light interacts with, and thereby amplifies, the light propagating through the optical fiber.

8. An optical device as in claim 1, further comprising:

a clad around the core and including first and second regions concentrically arranged around the core with the first region of the clad being between the core and the second region of the clad, wherein the first region of the clad has a refractive index which is less than the refractive index of the first region of the core, and the second region of the clad has a refractive index which is larger than the refractive index of the first region of the clad and lower than the refractive index of the third region of the core.

9. An optical device as in claim 8, wherein:

the second region of the clad includes first and second dopants which are the same as the first and second dopants, respectively, of the first region of the core; and the first region of the clad has an impurity concentration which is lower than the concentration of the dopant in the third region of the core, lower than the concentrations of the first and second dopants in the first region of the core, and lower than the concentrations of the first and second dopants in the second region of the clad.

10. An optical device as in claim 9, wherein the core and clad form an optical fiber which propagates light therethrough, the optical device further comprising:

a light source providing amplifying light to the optical fiber so that the amplifying light interacts with, and thereby amplifies, the light propagating through the optical fiber.

11. An optical device as in claim 8, wherein the core and clad form an optical fiber which propagates light therethrough, the optical device further comprising:
a light source providing amplifying light to the optical fiber so that the amplifying light interacts with, and thereby amplifies, the light propagating through the optical fiber.

12. An optical device comprising:
a core for propagating light, the core including first, second and third regions, the first, second and third regions being concentrically arranged with the second region around the first region and the third region around the second region, wherein
the third region includes a dopant for increasing the refractive index of the third region;
the first region includes a first dopant for providing an amplification band and a second dopant for expanding the amplification band; and
the second region has an impurity concentration which is lower than the concentration of the dopant in the third region and is lower than the concentrations of the first and second dopants in the first region.

13. An optical device as in claim 12, wherein the dopant of the third region is germanium, and the first and second dopants of the first region are erbium and aluminum, respectively.

14. An optical device as in claim 12, further comprising:
a light source providing amplifying light to the core so that the amplifying light interacts with, and thereby amplifies, light propagating through the core.

15. An optical device comprising:
a core; and
a clad concentrically arranged around the core, the core and clad functioning together as a waveguide, wherein
the core includes a dopant to provide the core with a refractive index which is higher than the refractive index of the clad,
the clad includes first and second regions concentrically arranged around the core with the first region being between the core and the second region,
the second region of the clad including a first dopant for providing an amplification band and a second dopant for expanding the amplification band, and
the first region has an impurity concentration which is lower than the concentration of the dopant in the core, and is lower than the concentrations of the first and second dopants in the second region.

16. An optical device as in claim 15, wherein the refractive index of the second region of the clad is higher than the refractive index of the first region of the clad.

17. An optical device as in claim 15, wherein the dopant of the core is germanium, and the first and second dopants of the second region of the clad are erbium and aluminum, respectively.

18. An optical device as in claim 16, wherein the core and clad form an optical fiber which propagates light therethrough, the optical device further comprising:
a light source providing amplifying light to the optical fiber so that the amplifying light interacts with, and thereby amplifies, the light propagating through the optical fiber.

19. An optical device comprising:
a core; and
a clad concentrically arranged around the core, wherein
the core includes a first dopant for providing the core with a refractive index which is higher than the refractive index of the clad so that the core and clad operate together as a waveguide, a second dopant for providing an amplification band and a third dopant for expanding the amplification band, and
the clad includes a diffusion region concentrically arranged around the core, the diffusion region including a dopant with a concentration substantially equal to the concentration of the third dopant in the core.

20. An optical device as in claim 19, wherein the first, second and third dopants of the core are germanium, erbium and aluminum, respectively.

21. An optical device as in claim 20, wherein the dopant of the diffusion region is aluminum.

22. An optical device as in claim 19, wherein:
the core includes first, second and third regions, the first, second and third regions being concentrically arranged with the second region around the first region and the third region around the second region,
the third region of the core includes the first dopant, and
the first region of the core includes the second and third dopants, and
the second region has an impurity concentration which is lower than the concentration of the first dopant in the third region and is lower than the concentrations of the first and second dopants in the first region.

23. An optical device as in claim 22, wherein the core and clad form an optical fiber which propagates light therethrough, the optical device further comprising:
a light source providing amplifying light to the optical fiber so that the amplifying light interacts with, and thereby amplifies, the light propagating through the optical fiber.

24. An optical device as in claim 19, wherein the clad further includes a barrier region between the core and the diffusion region, the barrier region having an impurity concentration which is lower than the concentration of the first, second and third dopants in the core, and is lower than the concentration of the dopant in the diffusion region.

25. An optical device as in claim 24, wherein the optical device is an optical fiber and the barrier region has a thickness between the core and the diffusion region which
prevents the dopant in the diffusion region from diffusing to the core during heating of the optical fiber in a process for manufacturing the optical fiber, and
allows the first dopant in the core to diffuse to the diffusion region by heating the optical fiber for splicing the optical fiber to a different optical fiber.

26. An optical device as in claim 24, wherein the core and clad form an optical fiber which propagates light therethrough, the optical device further comprising:
a light source providing amplifying light to the optical fiber so that the amplifying light interacts with, and thereby amplifies, the light propagating through the optical fiber.

27. An optical device as in claim 19, wherein the core and clad form an optical fiber which propagates light therethrough, the optical device further comprising:
a light source providing amplifying light to the optical fiber so that the amplifying light interacts with, and thereby amplifies, the light propagating through the optical fiber.

28. A method for splicing optical fibers together, comprising the steps of:

providing a first optical fiber which includes
a core, and
a clad concentrically arranged around the core, wherein
the core includes a first dopant for providing the core with a refractive index which is higher than the refractive index of the clad so that the core and clad operate together as a waveguide, a second dopant for providing an amplification band and a third dopant for expanding the amplification band, and
the clad includes a diffusion region concentrically arranged around the core, the diffusion region including a dopant with a concentration substantially equal to the concentration of the third dopant in the core;

providing a second optical fiber which includes a core, the core of the first optical fiber having a smaller diameter than the core of the second optical fiber;

contacting an end face of the first optical fiber to an end face of the second optical fiber; and heating the contacted end faces to connect the first optical fiber to the second optical fiber.

29. A method as in claim 28, wherein the diffusion region of the clad of the first optical fiber has an outer diameter which is substantially equal to the diameter of the core of the second optical fiber.

30. An optical device comprising:

first, second and third regions each having a corresponding refractive index, the first, second and third regions being concentrically arranged with the second region around the first region and the third region around the second region, for propagating light, wherein the refractive index of the third region is higher than the refractive index of the first region, and the refractive index of the first region is higher than the refractive index of the second region, wherein the third region includes a dopant for providing the refractive index of the third region, the first region includes a first dopant for providing an amplification band and a second dopant for expanding the amplification band, and the second region has an impurity concentration which is lower than the concentration of the dopant in the third region and is lower than the concentrations of the first and second dopants in the first region.

31. An optical device as in claim 30, further comprising:

a fourth region around the third region, the fourth region having a refractive index distribution which causes the first, second, third and fourth regions to function together as a waveguide.

32. An optical device as in claim 31, wherein the first, second, third and fourth regions together form an optical fiber which propagates light therethrough, the optical device further comprising:

a light source providing amplifying light to the optical fiber so that the amplifying light interacts with, and thereby amplifies, the light propagating through the optical fiber.

33. An optical device as in claim 30, wherein the first dopant in the first region is a rare earth material.

34. An optical device as in claim 30, wherein the dopant of the third region is germanium, and the first and second dopants of the first region are erbium and aluminum, respectively.

35. An optical device as in claim 30, further comprising:

fourth and fifth regions concentrically arranged around the third region with the fourth region being between the third region and the fifth region, wherein
the fourth region has a refractive index which is less than the refractive index of the first region, and
the fifth region has a refractive index which is larger then the refractive index of the fourth region and lower than the refractive index of the third region.

36. An optical device as in claim 35, wherein the first, second, third, fourth and fifth regions together form an optical fiber which propagates light therethrough, the optical device further comprising:

a light source providing amplifying light to the optical fiber so that the amplifying light interacts with, and thereby amplifies, the light propagating through the optical fiber.

37. An optical device as in claim 30, further comprising:

fourth and fifth regions concentrically arranged around the third region with the fourth region being between the third region and the fifth region, wherein
the fourth region has a refractive index which is less than the refractive index of the first region, and
the fifth region has a refractive index which is larger then the refractive index of the fourth region and lower than the refractive index of the third region.

38. An optical device as in claim 37, wherein:

the fifth region includes first and second dopants which are the same as the first and second dopants, respectively, of the first region; and
the fourth region has an impurity concentration which is lower than the concentration of the dopant in the third region, lower than the concentrations of the first and second dopants in the first region, and lower than the concentrations of the first and second dopants in the fifth region.

39. An optical device as in claim 38, wherein the first, second, third, fourth and fifth regions together form an optical fiber which propagates light therethrough, the optical device further comprising:

a light source providing amplifying light to the optical fiber so that the amplifying light interacts with, and thereby amplifies, the light propagating through the optical fiber.

40. An optical device as in claim 37, wherein the first, second, third, fourth and fifth regions together form an optical fiber which propagates light therethrough, the optical device further comprising:

a light source providing amplifying light to the optical fiber so that the amplifying light interacts with, and thereby amplifies, the light propagating through the optical fiber.

41. An optical device comprising:

first, second and third regions concentrically arranged with the second region around the first region and the third region around the second region, for propagating light, wherein
the third region includes a dopant for increasing the refractive index of the third region;
the first region includes a first dopant for providing an amplification band and a second dopant for expanding the amplification band; and
the second region has an impurity concentration which is lower than the concentration of the dopant in the third region and is lower than the concentrations of the first and second dopants in the first region.

42. An optical device as in claim 41, wherein the dopant of the third region is germanium, and the first and second dopants of the first region are erbium and aluminum, respectively.

43. An optical device as in claim 41, further comprising:
a light source providing amplifying light to the first region so that the amplifying light interacts with, and thereby amplifies, light propagating through the first region.

44. An optical device comprising:
first, second and third regions concentrically arranged with the second region around the first region and the third region around the second region so that the first, second and third regions together function as a waveguide, wherein
the first region includes a dopant to provide the first region with a refractive index which is higher than the refractive index of the second region,
the third region includes a first dopant for providing an amplification band and a second dopant for expanding the amplification band, and
the second region has an impurity concentration which is lower than the concentration of the dopant in the first region, and is lower than the concentrations of the first and second dopants in the third region.

45. An optical device as in claim 44, wherein the refractive index of the third region is higher than the refractive index of the second region.

46. An optical device as in claim 44, wherein the dopant of the first region is germanium, and the first and second dopants of the third region are erbium and aluminum, respectively.

47. An optical device as in claim 44, wherein the first, second and third regions together form an optical fiber which propagates light therethrough, the optical device further comprising:
a light source providing amplifying light to the optical fiber so that the amplifying light interacts with, and thereby amplifies, the light propagating through the optical fiber.

48. An optical device comprising:
first and second regions, with the second region concentrically arranged around the first region, wherein
the first region includes a first dopant for providing the first region with a refractive index which is higher than the refractive index of the second region so that the first and second regions operate together as a waveguide, a second dopant for providing an amplification band and a third dopant for expanding the amplification band, and
the second region includes a diffusion region concentrically arranged around the first region, the diffusion region including a dopant with a concentration substantially equal to the concentration of the third dopant in the first region.

49. An optical device as in claim 48, wherein the first, second and third dopants of the first region are germanium, erbium and aluminum, respectively.

50. An optical device as in claim 49, wherein the dopant of the diffusion region is aluminum.

51. An optical device as in claim 48, wherein:
the first region includes first, second and third sub-regions, the first, second and third sub-region being concentrically arranged with the second sub-region around the first sub-region and the third sub-region around the second sub-region,
the third sub-region includes the first dopant, and
the first sub-region includes the second and third dopants, and
the second sub-region has an impurity concentration which is lower than the concentration of the first dopant in the third sub-region and is lower than the concentrations of the first and second dopants in the first sub-region.

52. An optical device as in claim 51, wherein the first and second regions together form an optical fiber which propagates light therethrough, the optical device further comprising:
a light source providing amplifying light to the optical fiber so that the amplifying light interacts with, and thereby amplifies, the light propagating through the optical fiber.

53. An optical device as in claim 48, further comprising a barrier region between the first region and the diffusion region, the barrier region having an impurity concentration which is lower than the concentration of the first, second and third dopants in the first region, and is lower than the concentration of the dopant in the diffusion region.

54. An optical device as in claim 53, wherein the optical device is an optical fiber and the barrier region has a thickness between the first region and the diffusion region which
prevents the dopant in the diffusion region from diffusing to the first region during heating of the optical fiber in a process for manufacturing the optical fiber, and
allows the first dopant in the first regions to diffuse to the diffusion region by heating the optical fiber for splicing the optical fiber to a different optical fiber.

55. An optical device as in claim 53, wherein the first, second and barrier regions together form an optical fiber which propagates light therethrough, the optical device further comprising:
a light source providing amplifying light to the optical fiber so that the amplifying light interacts with, and thereby amplifies, the light propagating through the optical fiber.

56. An optical device as in claim 48, wherein the first and second regions together form an optical fiber which propagates light therethrough, the optical device further comprising:
a light source providing amplifying light to the optical fiber so that the amplifying light interacts with, and thereby amplifies, the light propagating through the optical fiber.

57. A method for splicing optical fibers together, comprising the steps of:
providing a first optical fiber which includes first and second concentrically arranged regions with the second region around the first regions, wherein
the first region includes a first dopant for providing the first region with a refractive index which is higher than the refractive index of the second region so that the first and second regions operate together as a waveguide, a second dopant for providing an amplification band and a third dopant for expanding the amplification band, and
the second region includes a diffusion region concentrically arranged around the first region, the diffusion region including a dopant with a concentration substantially equal to the concentration of the third dopant in the first region;
providing a second optical fiber which includes a core, the first region of the first optical fiber having a smaller diameter than the core of the second optical fiber;

contacting an end face of the first optical fiber to an end face of the second optical fiber; and heating the contacted end faces to connect the first optical fiber to the second optical fiber.

58. A method as in claim 57, wherein the diffusion region of the second region of the first optical fiber has an outer diameter which is substantially equal to the diameter of the core of the second optical fiber.

* * * * *

UNITED STATES PATENT AND TRADEMARK OFFICE
CERTIFICATE OF CORRECTION

PATENT NO. : 5,778,129

DATED : July 7, 1998

INVENTOR(S) : Shukunami et al.

It is certified that error appears in the above-identified patent and that said Letters Patent is hereby corrected as shown below:

Col. 1, line 64, change "optIcal" to --optical--.

Col. 3, line 44, after "fiber." start a NEW PARAGRAPH with "FIG. 2B..."

Col. 5, line 11, change "FIG. 1D" to --FIG. 1B--;
line 51, change "1" to --14.--.

Col. 7, line 52, delete "23";
line 67, change "SiO" to --SiO$_2$--.

Col. 8, line 29, change "In" to --in--;
line 48, change "Is" to --is--.

Col. 9, line 14, change "Prevented" to --prevented--;
line 20, change "FIG. 113" to --FIG. 11B--;
line 67, change "arid" to --and--.

Col. 12, line 51, change "Fig. SA" to --FIG. 5A--.

Col. 19, line 64, [Claim 51, line 3], change "sub-region" to --sub-regions--.

Signed and Sealed this

Twenty-third Day of February, 1999

Attest:

Q. TODD DICKINSON

*Attesting Officer*   *Acting Commissioner of Patents and Trademarks*